US012600144B2

(12) United States Patent
Kanematsu et al.

(10) Patent No.: US 12,600,144 B2
(45) Date of Patent: Apr. 14, 2026

(54) LIQUID DISCHARGE HEAD AND LIQUID DISCHARGE APPARATUS

(71) Applicants: Toshihiro Kanematsu, Kanagawa (JP); Yasunori Sugimoto, Kanagawa (JP); Jun Zhang, Kanagawa (JP); Mizuki Otagiri, Kanagawa (JP); Sho Kawakami, Kanagawa (JP)

(72) Inventors: Toshihiro Kanematsu, Kanagawa (JP); Yasunori Sugimoto, Kanagawa (JP); Jun Zhang, Kanagawa (JP); Mizuki Otagiri, Kanagawa (JP); Sho Kawakami, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 83 days.

(21) Appl. No.: 18/437,269

(22) Filed: Feb. 9, 2024

(65) Prior Publication Data

US 2024/0269988 A1 Aug. 15, 2024

(30) Foreign Application Priority Data

Feb. 9, 2023 (JP) ................................ 2023-018203

(51) Int. Cl.
*B41J 2/14* (2006.01)
*B41J 2/175* (2006.01)

(52) U.S. Cl.
CPC ......... *B41J 2/17596* (2013.01); *B41J 2/1429* (2013.01); *B41J 2202/05* (2013.01)

(58) Field of Classification Search
CPC ........ B41J 2/14; B41J 2/14233; B41J 2/1433; B41J 2/162; B41J 2/17596; B41J 2/29; B41J 2002/14475; B41J 2202/05
See application file for complete search history.

(56) References Cited

U.S. PATENT DOCUMENTS 4,628,330 A 12/1986 Suga et al.
2006/0061640 A1* 3/2006 Doi ........................ C09D 11/30 347/100
(Continued)

FOREIGN PATENT DOCUMENTS

DE 3634747 A1 8/1987
EP 3825100 A1 5/2021
(Continued)

OTHER PUBLICATIONS

Extended European search report issued on Jun. 17, 2024, in corresponding European patent Application No. 24156357.6, 7 pages.

*Primary Examiner* — Anh T Vo
(74) *Attorney, Agent, or Firm* — XSENSUS LLP

(57) ABSTRACT

A liquid discharge head includes a first housing, a sealing member, and a second housing. The first housing includes a nozzle from which a liquid is dischargeable and a liquid chamber communicating with the nozzle. The sealing member openably closes the nozzle. The second housing includes a moving member and a container. The moving member moves a portion of the sealing member between a first position at which the portion of the sealing member contacts the nozzle to close the nozzle and a second position at which the portion of the sealing member is separated from the nozzle to open the nozzle. The container stores and holds the moving member in the container. The sealing member is sandwiched between the first housing and the second housing to partition the liquid chamber and the container.

19 Claims, 18 Drawing Sheets

(56) References Cited

U.S. PATENT DOCUMENTS

| | | | |
|---|---|---|---|
| 2009/0051735 | A1 | 2/2009 | Takahashi et al. |
| 2014/0078220 | A1 | 3/2014 | Sawada et al. |
| 2018/0326195 | A1 | 11/2018 | Yamabe et al. |
| 2020/0246813 | A1 | 8/2020 | Fritz et al. |
| 2022/0379609 | A1* | 12/2022 | Matsufuji ............ B41J 2/14201 |
| 2023/0373214 | A1 | 11/2023 | Kawakami et al. |

FOREIGN PATENT DOCUMENTS

| | | | |
|---|---|---|---|
| WO | 2018/108576 | A1 | 6/2018 |
| WO | 2019/063136 | A1 | 4/2019 |

* cited by examiner

LIQUID DISCHARGE HEAD AND LIQUID DISCHARGE APPARATUS

CROSS-REFERENCE TO RELATED APPLICATION

This patent application is based on and claims priority pursuant to 35 U.S.C. § 119(a) to Japanese Patent Application No. 2023-018203, filed on Feb. 9, 2023, in the Japan Patent Office, the entire disclosure of which is hereby incorporated by reference herein.

BACKGROUND

Technical Field

Embodiments of the present disclosure relate to a liquid discharge head and a liquid discharge apparatus.

Related Art

A liquid discharge apparatus is known that discharges ink from nozzles onto a medium to perform drawing on the medium. The above-described liquid discharge apparatus includes at least a nozzle plate on which the nozzles are formed, valves which slide to reciprocate in a direction substantially perpendicularly to the nozzle plate to open and close the nozzles, and a channel in which ink flows. A predetermined pressure is applied to the channel in which the ink flows. Each of the valves reciprocates to open and close the channel between the corresponding one of the nozzles and the valve. By so doing, the amount of ink discharged from the nozzles is controlled. Alternatively, in such a liquid discharge apparatus, a valve is known that is formed of a material, such as a plastic or rubber, which bends by a weak force, in particular, to enhance the sealing property of the valve to seal the ink.

For example, a printing head has been disclosed that applies a coating liquid to a component. In particular, a print head that applies a paint to a body component of a motor vehicle is disclosed. Such a printing head includes a nozzle plate, at least one nozzle on the nozzle plate to discharge the coating liquid, a movable valve element that is movable relative to the nozzle plate and controls the discharge of the coating liquid through the nozzle. The movable valve element includes a valve which closes the nozzle in a closed position and releases the nozzle in an open position. The printing head further includes a sealing member to seal the nozzle relative to the movable valve element at the closed position, and the sealing member is not formed as an elastic body insertable on the valve element.

SUMMARY

In an embodiment of the present disclosure, a liquid discharge head includes a first housing, a sealing member, and a second housing. The first housing includes a nozzle from which a liquid is dischargeable and a liquid chamber communicating with the nozzle. The sealing member openably closes the nozzle. The second housing includes a moving member and a container. The moving member moves a portion of the sealing member between a first position at which the portion of the sealing member contacts the nozzle to close the nozzle and a second position at which the portion of the sealing member is separated from the nozzle to open the nozzle. The container stores and holds the moving member in the container. The sealing member is sandwiched between the first housing and the second housing to partition the liquid chamber and the container.

In another embodiment of the present disclosure, a liquid discharge apparatus includes the liquid discharge head, a discharge head support to support the liquid discharge head, and a liquid supply device to supply the liquid to the liquid discharge head.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1A:
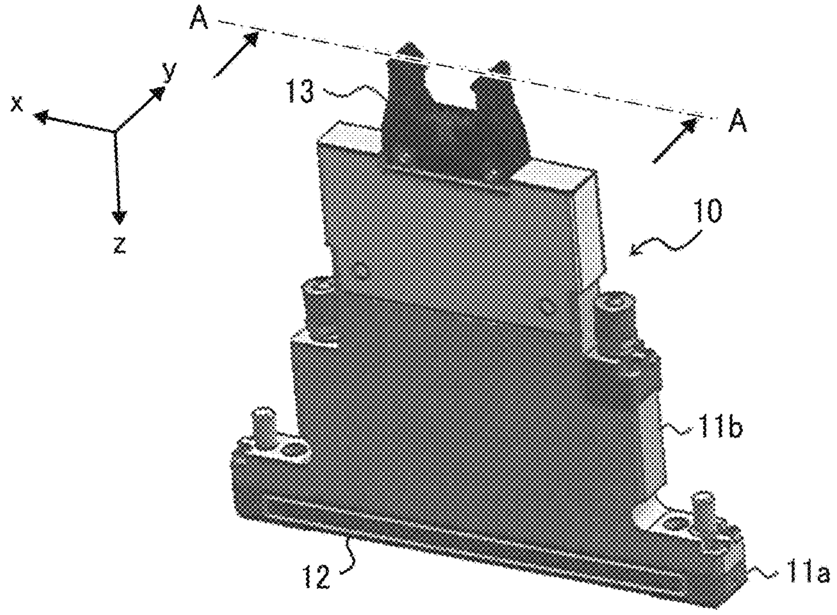
FIG. 1A is an overall perspective view of a liquid discharge head according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms “a,” “an,” and “the” are intended to include the plural forms as well, unless the context clearly indicates otherwise.

Embodiments of the present disclosure are described below with reference to the drawings.

In the drawings for illustrating embodiments of the present disclosure, like reference numerals are assigned to elements such as members and parts that have a like function or a like shape as long as differentiation is possible, and descriptions of such elements may be omitted once the description is provided.

Figure 1B:
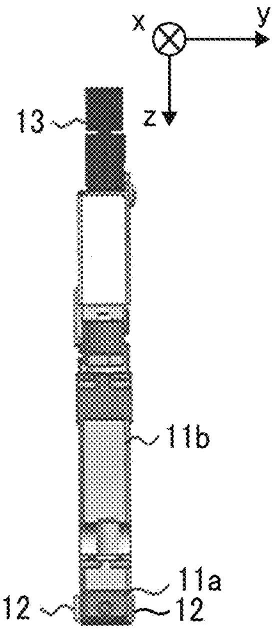
FIG. 1B is an overall side view of the liquid discharge head of FIG. 1A.

FIGS. 1A and 1B are external views of a liquid discharge head 10 according to an embodiment of the present disclosure. FIG. 1A is an overall perspective view of the liquid discharge head 10. FIG. 1B is an overall side view of the liquid discharge head 10. The liquid discharge head 10 according to the present embodiment discharges ink as liquid. First, the liquid discharge head 10 of the present embodiment is described with reference to FIGS. 1A and 1B.

In the present embodiment, the width direction of the liquid discharge head 10, i.e., the direction in which nozzles are arranged in FIG. 1A or a direction perpendicular to the sheet surface in FIG. 1B, is x direction. The depth direction of the liquid discharge head 10 in FIG. 1A, i.e., the lateral direction in FIG. 1B, is y direction. The height direction of the liquid discharge head 10 in FIG. 1A, i.e., the vertical direction in FIG. 1B, is z direction, which is a direction in which on-off valves to be described below open and close, the longitudinal direction of piezoelectric elements, and the vertical direction in FIG. 2. The above-described definitions of the x direction, the y direction, and the z direction are similar in the following drawings unless otherwise specified.

The liquid discharge head 10 that serves as a liquid discharge head, includes a first housing 11*a* and a second housing 11*b*. The second housing 11*b* is stacked on and bonded to the first housing 11*a*. The first housing 11*a* is formed of a material having high thermal conductivity, such as metal. The second housing 11*b* is formed of a material similar to the material of which the first housing 11*a* is formed. In the following description, the first housing 11*a* and the second housing 11*b* are collectively referred to as a housing 11 unless distinguished.

The first housing 11*a* includes heaters 12 as heaters on the front side and the rear side of the first housing 11*a*. The temperature at which the heaters 12 heat the first housing 11*a*, is controllable. The second housing 11*b* includes a connector 13 in an upper portion of the second housing 11*b* to communicate electric signals.

Figure 2:
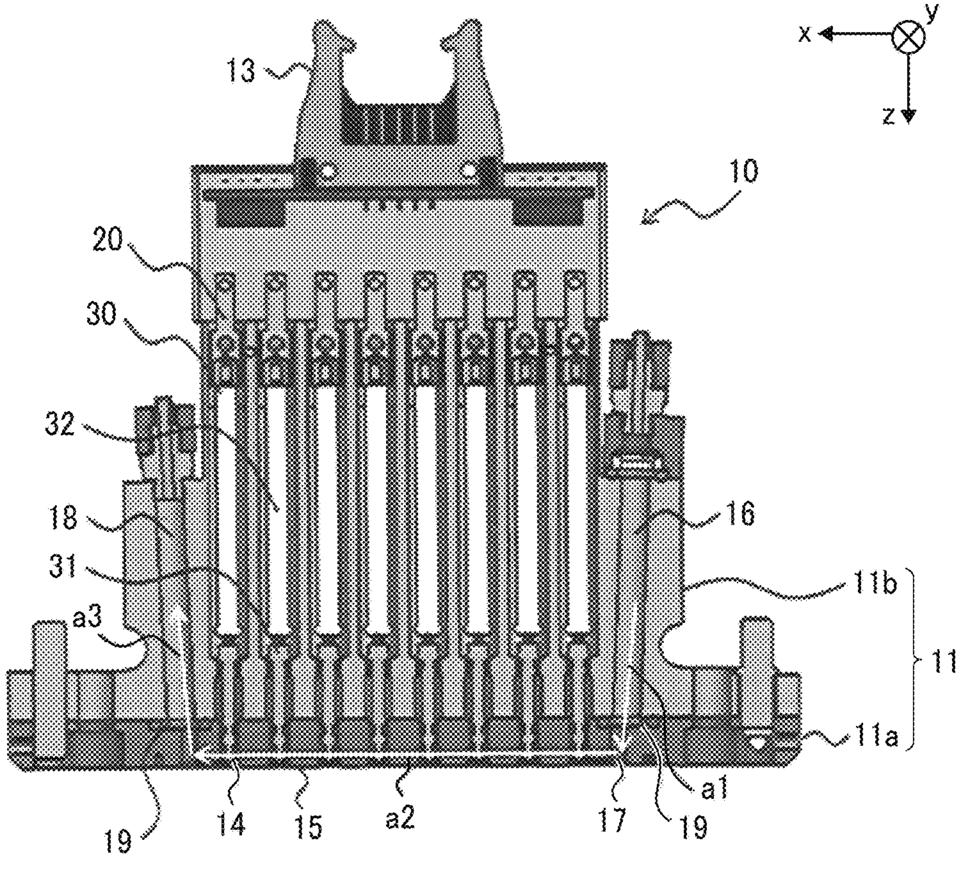
FIG. 2 is an overall cross-sectional view of the liquid discharge head of FIG. 1A, cut along a cross section A-A in FIG. 1A.

FIG. 2 is an overall cross-sectional view of the liquid discharge head of FIGS. 1A and 1B, cut along a cross section A-A in FIG. 1A. The first housing 11*a* holds a nozzle plate 15, which serves as a member to form discharge ports. The nozzle plate 15 includes nozzles 14, which serve as discharge ports to discharge liquid. The first housing 11*a* includes a channel 17, which serves as a liquid supply channel. The channel 17 may be referred to simply as a liquid chamber in the following description. The channel 17 sends ink supplied from a supply port 16 to a collection port 18 via an upper surface of the nozzle plate 15.

The second housing 11*b* includes the supply port 16 and the collection port 18. The supply port 16 and the collection port 18 are connected to one side and the other side of the channel 17, respectively. Multiple liquid discharge modules 30 are disposed between the supply port 16 and the collection port 18. The liquid discharge modules 30 discharge ink in the channel 17 from corresponding one of the nozzles 14. In addition, a restricting member 20 is disposed on an upper portion of each of the liquid discharge modules 30.

The number of the liquid discharge modules 30 corresponds to the number of the nozzles 14 disposed on the first housing 11*a*. In the present embodiment, eight of the liquid discharge modules 30 that correspond to eight of the nozzles 14 arranged in a row are disposed. The number and arrangement of the nozzles 14 and the liquid discharge modules 30 are not limited to the above-described number and arrangement. For example, the number of the nozzles 14 and the number of the liquid discharge modules 30 may be one instead of multiple. The nozzles 14 and the liquid discharge modules 30 may be arranged in multiple rows instead of one row.

In FIG. 2, a housing seal 19 that serves as a housing sealing member, is disposed at a joint between the first housing 11*a* and the second housing 11*b*. In the present embodiment, an O-ring is employed as the housing seal 19, and the housing seal 19 as the O-ring prevents ink from leaking from the joint between the first housing 11*a* and the second housing 11*b*.

Such a configuration as described above allows the supply port 16 to take in pressurized ink from outside, send the ink in a direction indicated by arrow a1, and supply the ink to the channel 17. The channel 17 sends the ink supplied from the supply port 16 in a direction indicated by arrow a2. The collection port 18 collects the ink, which has not been discharged from the nozzles 14 arranged along the channel 17, in a direction indicated by arrow a3.

The liquid discharge module 30 includes an on-off valve 31 and a piezoelectric element 32 as a driver. The on-off valves 31 open and close the respective nozzles 14. The piezoelectric elements 32 drive the respective on-off valves 31. The piezoelectric element 32 expands and contracts in a longitudinal direction of the piezoelectric element 32, which is the vertical direction, i.e., the z direction in FIG. 2, when a voltage is applied to the piezoelectric element 32.

In the above-described configuration, when the piezoelectric element 32 is operated to move the on-off valve 31 upward, the nozzle 14 that has been closed by the on-off valve 31 is opened. Accordingly, ink can be discharged from the nozzle 14. When the piezoelectric element 32 is operated to move the on-off valve 31 downward, an end of the on-off valve 31 seals the nozzle 14 to close the nozzle 14. Accordingly, ink is not discharged from the nozzle 14.

Figure 3:
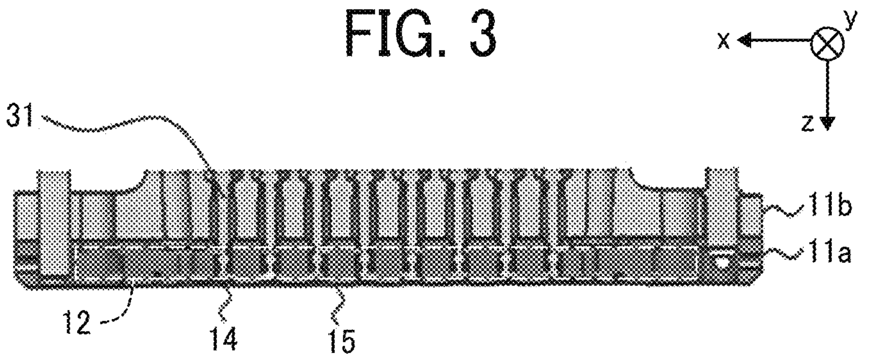
FIG. 3 is a cross-sectional view of a lower portion of the liquid discharge head of FIG. 2, indicating the relative positions of a heater and the liquid discharge head, according to an embodiment of the disclosure.

FIG. 3 is a cross-sectional view of a lower portion of the liquid discharge head 10, indicating the relative positions of the heater 12 and the liquid discharge head 10, according to an embodiment of the disclosure. The first housing 11*a* includes the heaters 12. As indicated by a broken line in FIG. 3, each of the heaters 12 is disposed in the vicinity of the nozzles 14 such that each of the heaters 12 crosses the multiple nozzles 14.

Comparative Example

Subsequently, a liquid discharge module according to a comparative example is described in detail below. Before describing the details of the liquid discharge module 30 according to embodiments of the present disclosure, a liquid discharge module according to the comparative example to be compared with the liquid discharge module 30 is described. Subsequently, the disadvantage of the liquid discharge module according to the comparative example is described. Subsequently, circumstances that led to embodiments of the present disclosure are described below.

Figure 4A:
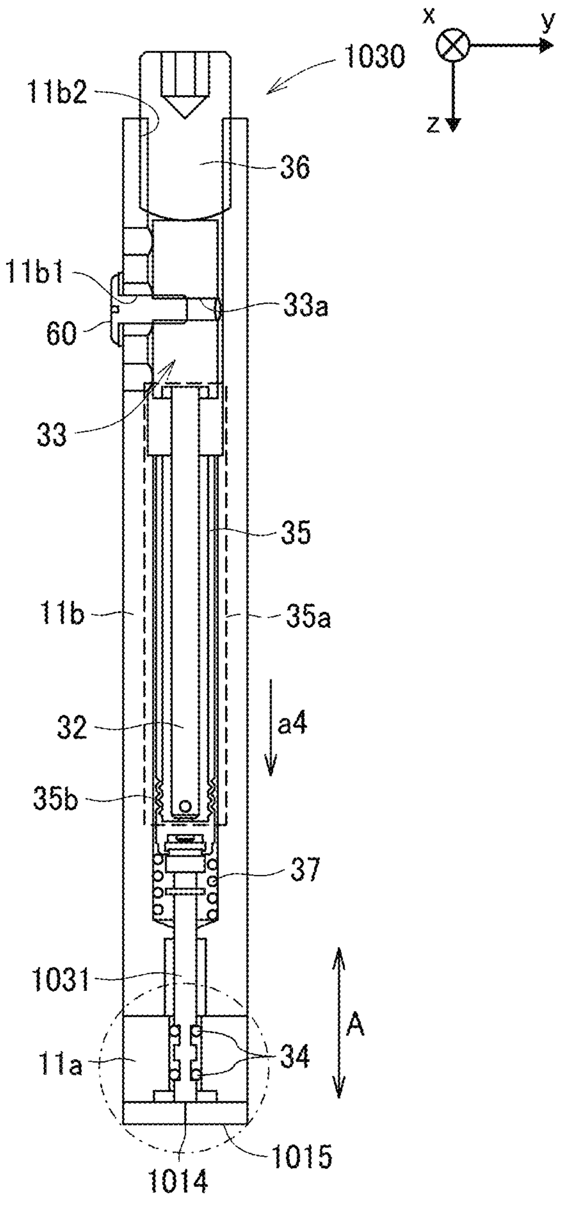
FIGS. 4A and 4B are diagrams each illustrating a liquid discharge module according to a comparative example of the present disclosure.
Figure 4B:
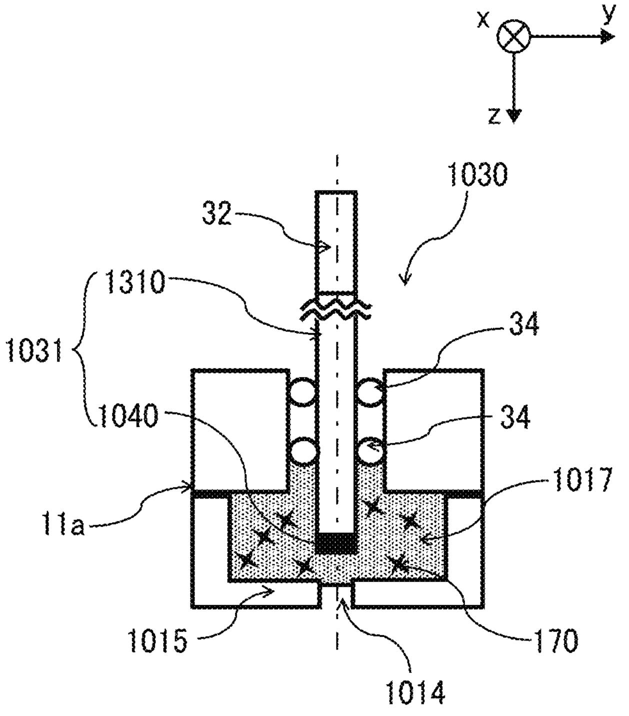

FIGS. 4A and 4B are diagrams each illustrating a liquid discharge module 1030 according to a comparative example of the above embodiments of the present disclosure. FIG. 4A is a cross-sectional view of the single liquid discharge module 1030. FIG. 4B is an enlarged diagram illustrating a relevant portion of the liquid discharge module 1030. Specifically, FIG. 4B is an enlarged diagram illustrating a portion surrounded by a circle of a dashed line in FIG. 4A, i.e., a portion in the vicinity of a nozzle 1014 of the liquid discharge module 1030. O-rings 34 are mounted on the outer circumferential surface of the shaft of an on-off valve 1031 in two stages, i.e., the upper and lower stages, to prevent high-pressurized ink from leaking.

The liquid discharge module 1030 typically includes, for example, the on-off valve 1031, the piezoelectric element 32 described above, a fixing member 33, a holder 35, and a plug 36.

The holder 35 includes a driver container 35*a* inside the holder 35. The holder 35 contains and holds the piezoelectric element 32 in the driver container 35*a*. The holder 35 is made of metal that is elastically expandable and contractible in the longitudinal direction of the piezoelectric element 32. As a metal that is elastically expandable and contractible, stainless steel such as SUS304 or SUS316L can be employed.

The holder 35 is a frame in which multiple elongated members extending in the longitudinal direction of the piezoelectric element 32 are arranged around the piezoelectric element 32. For example, four elongated members are arranged at intervals of 90°. The piezoelectric element 32 is inserted into the holder 35 inside the elongated members of the holder 35.

The longitudinal direction of the piezoelectric element 32 is a direction indicated by double-headed arrow A illustrated in FIG. 4A. The direction indicated by the double-headed arrow A is also the longitudinal direction of the on-off valve 1031, the liquid discharge module 1030, and the second housing 11*b*. The direction indicated by the double-headed arrow A is a direction in which the on-off valve 1031 moves, a height direction of the liquid discharge head 10 in FIGS. 1A and 1B, i.e., the z direction, and the vertical direction in FIG. 2.

The on-off valve 1031 is connected to an end of the holder 35 closer to the nozzle 14. A bellows portion 35*b* is formed in a portion of the holder 35 closer to the nozzle 14. The bellows portion 35*b* causes the end of the holder 35 to expand and contract in the longitudinal direction of the piezoelectric element 32 in a similar manner to the piezoelectric element 32 when the piezoelectric element 32 expands and contracts.

The fixing member 33 is connected to the base end of the holder 35, which is opposite the end of the holder 35 closer to the nozzle 14. In other words, the fixing member 33 is contained in the upper end of the second housing 11*b*.

The fixing member 33 includes a through-screw hole 33*a* extending in the radial direction of the fixing member 33. A positioning screw 60 is screwed into the through-screw hole 33*a* from the outside of the second housing 11*b*.

The positioning screw 60 is inserted into a long hole 11*b*1 formed in the upper end of the second housing 11*b* in the longitudinal direction. Accordingly, the positioning screw 60 is movable in the longitudinal direction of the second housing 11*b* by a predetermined distance. The positioning screw 60 is tightened with the fixing member 33 being positioned in the longitudinal direction.

As illustrated in FIG. 4A, a female screw hole 11*b*2 is formed in an upper-end opening of the second housing 11*b*. A plug 36 that contacts the restricting member 20 illustrated in FIG. 2 is screwed into the female screw hole 11*b*2. The plug 36 contacts an upper end of the fixing member 33 positioned in the longitudinal direction by the positioning screw 60 to finally fix the position of the fixing member 33.

A compression spring 37 is disposed in the lower end of the second housing 11*b*. For example, the piezoelectric element 32, the holder 35 that holds the piezoelectric element 32 are biased upward by the compression spring 37.

As illustrated in FIG. 4B, the on-off valve 1031 includes a shaft-shaped needle 1310. A valve 1040 that is formed of an elastic material such as rubber is attached to a tip of the needle 1310 closer to the nozzle 1014. The shaft-shaped needle 1310 is formed of metal such as stainless steel.

The driving unit includes the piezoelectric element 32 to serve as a driving member to cause the on-off valve 1031 to reciprocate. The needle 1310 of the on-off valve 1031 is coupled to the piezoelectric element 32 and interlocks the driving motion of the needle 1310 with the valve 1040.

When the piezoelectric element 32 is operated to move the valve 1040 attached to the tip of the needle 1310, downward toward the nozzle 1014 in FIG. 4A, the valve 1040 attached to the tip of the needle 1310 of the on-off valve 1031 is pressed against a nozzle plate 1015. Accordingly, the valve 1040 seals the nozzle 1014.

By contrast, when the on-off valve 31 is moved upward in FIG. 4A, the valve 1040 is separated from the nozzle plate 1015. Accordingly, the nozzle 1014 is opened. As described above, the on-off valve 1031 moves between a position at which the valve 1040 is pressed against and contacts the nozzle plate 1015 and a position at which the on-off valve 1031 is separated from the nozzle plate 15. By so doing, the nozzle 1014, i.e., the discharge port, is opened and closed.

In the present embodiment, in the above-described configuration, the valve 1040, formed of the elastic material, of the on-off valve 31 contacts the nozzle 1014 when the valve 1040 is closed. By so doing, the valve 1040 is worn. Ink that may contain particles 170 such as hard pigments containing inorganic substances as components may be employed. In the configuration according to the comparative example, in particular, when the above-described ink is employed, the particles 170 enter between the on-off valve 1031 and the nozzle 1014 which are driven to reciprocate. As a result, for example, the on-off valve 1031 may be worn by the particles 170 which have entered between the on-off valve 1031 and the nozzle 1014. When the on-off valve 1031 is worn, the sealing performance of the on-off valve 1031 may not be maintained. As a result, ink may leak.

For this reason, in the liquid discharge module 1030 according to the comparative example, the driving unit that includes the worn valve 1040 is replaced to solve the above-described problem. However, in this case, the entire driving unit is replaced. Accordingly, the operation to replace the driving unit is not easy. In addition, the entire driving unit is replaced. Accordingly, the cost is increased. For this reason, the liquid discharge module 30 according to embodiments of the present disclosure has a configuration described below.

First Embodiment

Figure 5A:
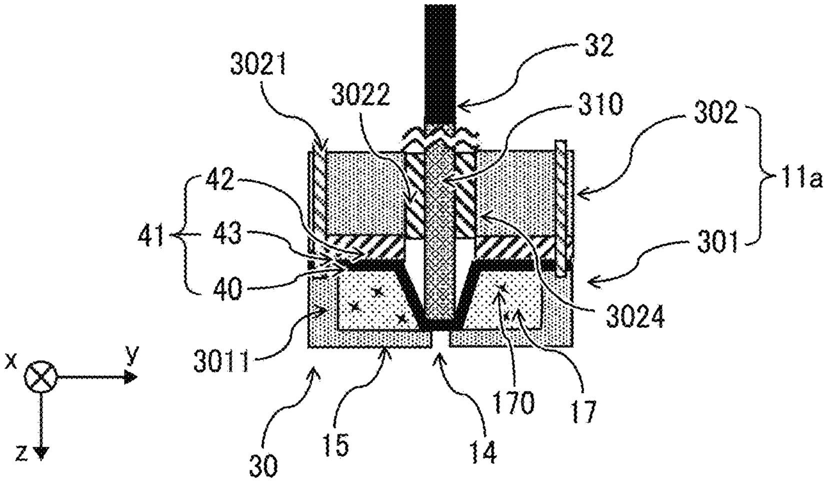
FIGS. 5A, 5B, and 5C are cross-sectional views of a liquid discharge module according to a first embodiment of the present disclosure.
Figure 5B:
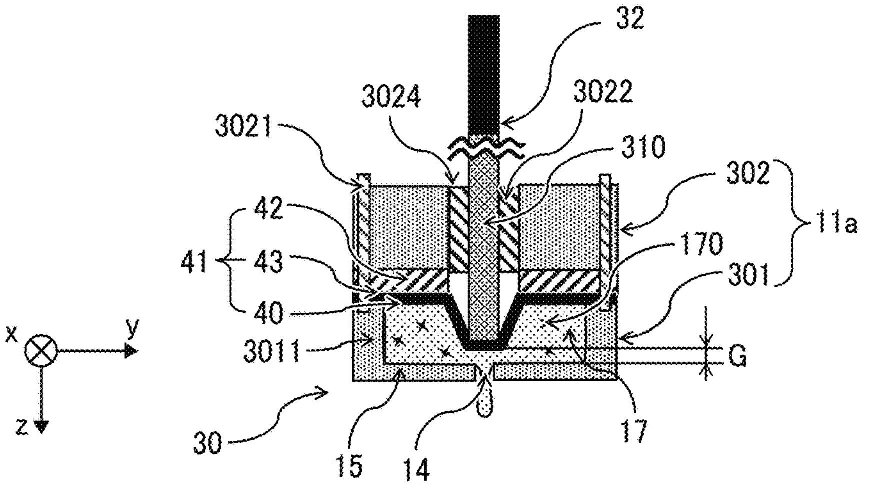
Figure 5C:
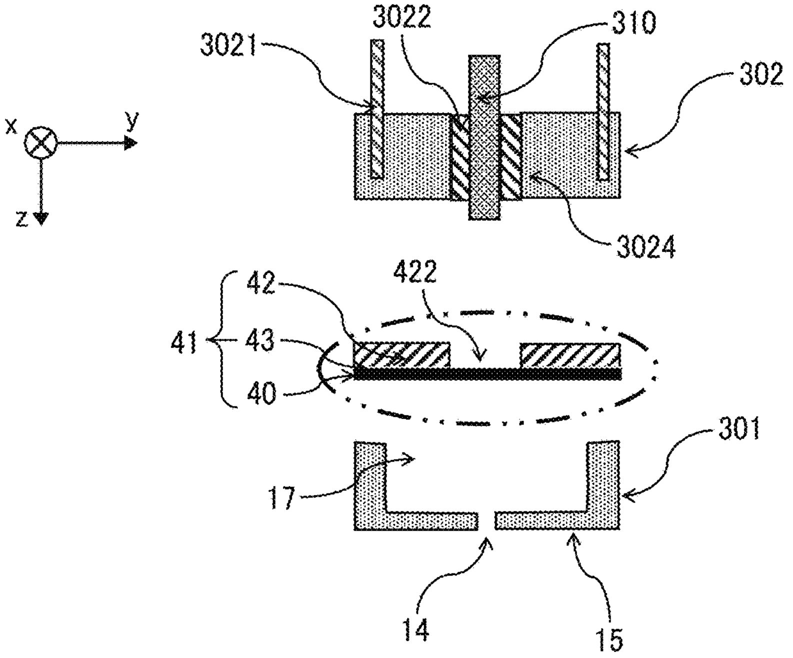

FIGS. 5A, 5B, and 5C are cross-sectional views of the liquid discharge module 30 according to a first embodiment of the present disclosure. FIG. 5A is a cross-sectional view of the liquid discharge module 30 when the on-off valve 31 closes the nozzle 14. FIG. 5B is a cross-sectional view of the liquid discharge module 30 when the on-off valve 31 opens the nozzle 14. FIG. 5C is an exploded view of the liquid discharge module 30, illustrating that the nozzle-side housing 301 and the needle-side housing 302 and a sealing member 41 can be separated from each other. The first embodiment of the present disclosure is described below with reference to FIGS. 5A, 5B, and 5C.

In the first embodiment, with respect to the above-described problems, a portion of the liquid discharge module 30 in the vicinity of the nozzle 14, which is substantially the first housing 11*a*, is divided into two housings, i.e., the nozzle-side housing 301 and the needle-side housing 302 such that a valve 40 is sandwiched between the nozzle-side housing 301 and the needle-side housing 302, as illustrated in FIG. 5C. The above-described configuration of the liquid discharge module 30 is described in detail below. The configuration of the liquid discharge module 30 other than the above-described portion of the liquid discharge module 30 in the vicinity of the nozzle 14 is similar to the configuration of the liquid discharge module 1030 according to the comparative example.

In the present embodiment, the first housing 11*a* includes the nozzle-side housing 301, which serves as a first housing, and the needle-side housing 302, which serves as a second housing. First, the above-described nozzle-side housing 301 and the needle-side housing 302 are described.

The nozzle-side housing 301 is a housing closer to the liquid chamber, i.e., the channel 17, to guide ink such that the ink is discharged from the nozzle 14. The nozzle-side housing 301 includes the nozzle 14, the nozzle plate 15, and a wall 3011 that forms the channel 17, i.e., the liquid chamber.

By contrast, the needle-side housing 302 is a housing closer to the driving unit in which the on-off valve 31 including the shaft-shaped needle 310 is positioned. The needle-side housing 302 fixes the driving unit and couples with the nozzle-side housing 301. The needle-side housing 302 includes a needle container 3024, which serves as a container to house the needle 310. The needle-side housing 302 also holds the needle 310.

The piezoelectric element 32 as the driving unit according to embodiments of the present disclosure is described below. The driving unit includes the needle 310, which serves as a moving unit. The needle 310 moves a portion of a valve 40 included in the sealing member 41 described below from a position at which the portion of the valve 40 is pressed against the nozzle 14, i.e., a first position, to a position at which the portion of the valve 40 is separated from the nozzle 14, i.e., a second position. The needle 310 is coupled with the piezoelectric element 32 of the driving unit such that drive motion, i.e., reciprocating movement of the needle 310 is linked with the portion of the valve 40.

In the present embodiment, the outer diameter of the needle 310 is φ 1 mm. The needle 310 includes a bearing 3022 which serves as a sliding member to cause the needle 310 to reciprocate without positional deviation. In the present embodiment, the bearing 3022 is formed of metal such as brass. The diameter of the bearing 3022 is φ 1 mm.

Subsequently, the sealing member 41 according to embodiments of the present disclosure is described below. The sealing member 41 serves as a partition to separate the nozzle-side housing 301 and the needle-side housing 302. The sealing member 41 separates the nozzle-side housing 301 and the needle-side housing 302 from each other. By so doing, a sealing effect can be obtained. In the present embodiment, the sealing member 41 includes the valve 40, which serves as a valve, and a reinforcement plate 42, which serves as a reinforcing member, to support the valve 40. The valve 40 and the reinforcement plate 42 function to provide a sealing effect. The valve 40 and the reinforcement plate 42 are described below.

The valve 40 is an elastic member. A portion of the valve 40 follows the reciprocating movement of the needle 310. By so doing, the valve 40 moves between a position at which the valve 40 is pressed against and contacts the nozzle plate 15 as illustrated in FIG. 5A and a position at which the valve 40 is separated from the nozzle plate 15 as illustrated in FIG. 5B. Accordingly, the portion of the valve 40 opens and closes the nozzle 14.

The valve 40 separates the nozzle-side housing 301 and the needle-side housing 302 from each other. Accordingly, the valve 40 also serves as a sealing member to prevent the ink in the nozzle-side housing 301 from flowing out to the needle-side housing 302.

The valve 40 performs the above-described functions. For this reason, preferably, the valve 40 has a configuration such that the valve 40 can perform the functions. For this reason, the valve 40 is made of a material which is sufficiently stretchable and flexible, such as an elastic sheet. In the present embodiment, FFKM (registered trademark manufactured by Du Pont), which has a thickness of 0.1 mm and is made of perfluoroelastomer or perfluoro rubber, is employed as an example.

The above-described material is employed for the valve 40. Accordingly, the needle 310 is movable and can also reach the nozzle 14. Thus, opening and closing the on-off valve 31 allows discharging ink to be controlled. In the present embodiment, when ink is discharged, the valve 40 is elastically deformed in accordance with the amount of the reciprocating movement of the needle 310. By so doing, the nozzle 14 and the valve 40 can contact each other or can be separated from each other, in other words, the on-off valve 31 can be opened or closed.

Such a configuration as described above allows turning on and off of discharging ink to be controlled. As illustrated in FIG. 5B, the amount of ink to be discharged is determined by a gap G, which is the amount of a gap between the valve 40 and the nozzle 14.

Figures 6A, 6B, 6C, 6D:
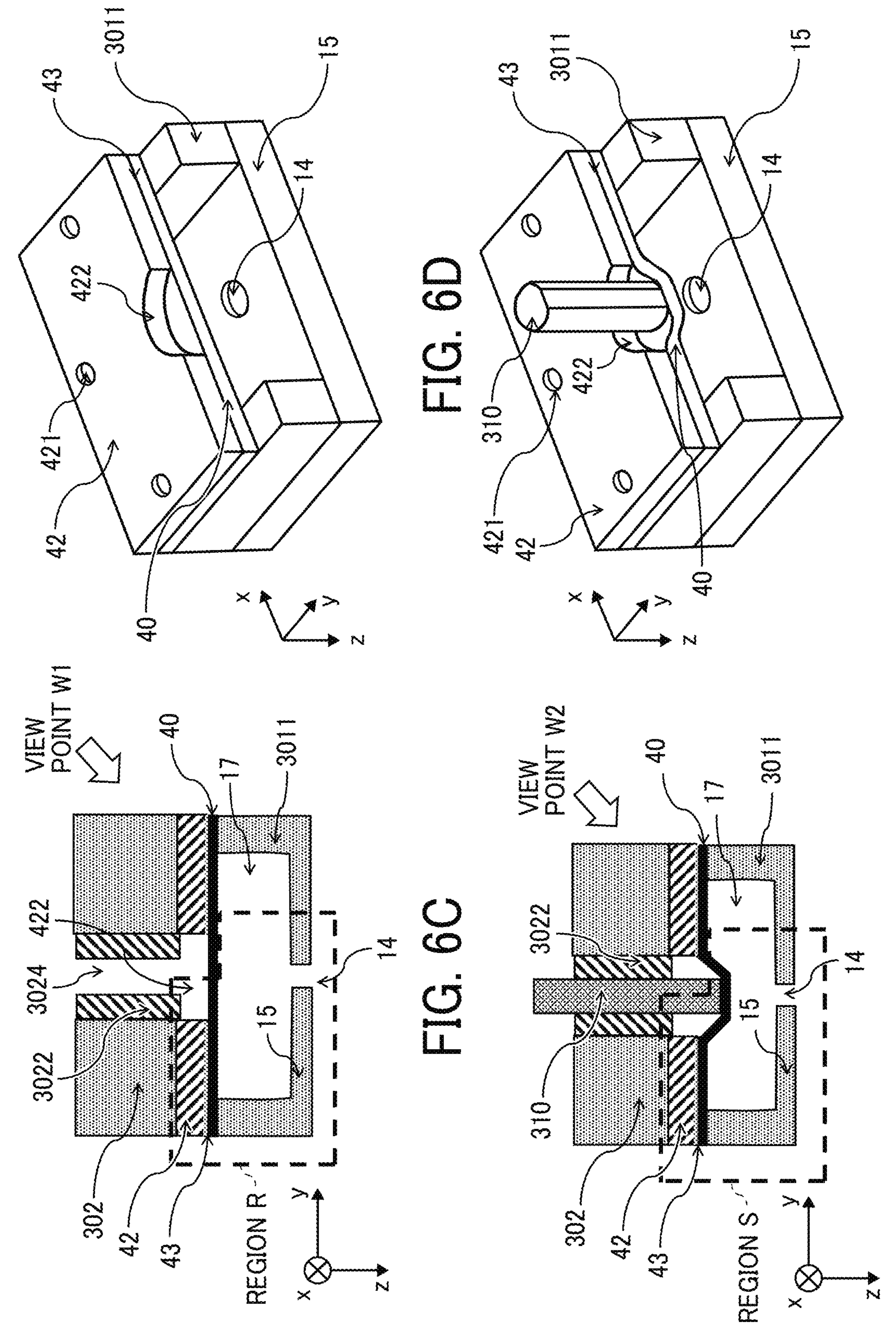
FIGS. 6A and 6C are cross-sectional views of a reinforcement plate and components around the reinforcement plate, according to a first embodiment of the present disclosure.
FIGS. 6B and 6D are perspective views of the reinforcement plate and the components of FIGS. 6A and 6C.

Subsequently, the reinforcement plate 42 is described with reference to FIGS. 6A, 6B, 6C, and 6D. FIGS. 6A and 6C are cross-sectional views of the reinforcement plate 42 and components around the reinforcement plate 42, according to the first embodiment of the present disclosure. FIGS. 6B and 6D are perspective views of the reinforcement plate 42 and the components around the reinforcement plate 42, according to the first embodiment. The reinforcement plate 42 is described with reference to the perspective views of FIGS. 6B and 6D, including the external appearance of the reinforcement plate 42.

FIGS. 6A and 6C are cross-sectional views of the reinforcement plate 42 and components around the reinforcement plate 42, each indicating from which angle the perspective views of FIGS. 6B and 6D are viewed. FIG. 6A is a cross-sectional view and FIG. 6B is a perspective view of the reinforcement plate 42 and components around the reinforcement plate 42 before the needle 310 is assembled with the reinforcement plate 42. FIG. 6C is a cross-sectional view of the reinforcement plate 42, and FIG. 6D is a perspective view of the reinforcement plate 42 and components around the reinforcement plate 42 when the needle 310 is assembled with the reinforcement plate 42.

FIG. 6A is a cross-sectional view of the reinforcement plate 42 and the components around the reinforcement plate 42 before the on-off valve 31 including the needle 310 is assembled with the reinforcement plate 42. FIG. 6B is a perspective view of the reinforcement plate 42 and the components around the reinforcement plate 42 when a region R in FIG. 6A is viewed from a viewpoint W1 of FIG. 6A. FIG. 6C is a cross-sectional view of the reinforcement plate 42 and components around the reinforcement plate 42 when the on-off valve 31 that includes the needle 310 is inserted. FIG. 6D is a perspective view of the reinforcement plate 42 and the components around the reinforcement plate 42 when a region S in FIG. 6C is viewed from a viewpoint W2 of FIG. 6C.

In the present embodiment, as illustrated in FIGS. 6B and 6D, a plate having high rigidity is employed for the reinforcement plate 42 such that the reinforcement plate 42 may not be deformed by a tensile load of the valve 40. In the present embodiment, the reinforcement plate 42 is formed of metal such as steel use stainless (SUS). The reinforcement plate 42 is disposed such that the reinforcement plate 42 contacts a portion of the needle-side housing 302 opposite a surface of the reinforcement plate 42 bonded to the valve 40 in the moving direction of the needle 310.

The reinforcement plate 42 has a thickness of 0.5 mm. As illustrated in FIGS. 6B and 6D, the reinforcement plate 42 includes a needle hole 422 into which the needle 310 is inserted. The needle hole 422 has a circular shape in the present embodiment. However, the needle hole 422 may have a rectangular shape.

An adhesive layer 43 is formed between the valve 40 and the reinforcement plate 42. The adhesive layer 43 is a layer formed of an adhesive. Accordingly, the valve 40 and the reinforcement plate 42 are joined to each other by the adhesive layer 43.

The reinforcement plate 42 has a thickness of only 0.5 mm as described above. Accordingly, it is not desirable to join the valve 40 and the reinforcement plate 42 by fastening with screws. For this reason, in the present embodiment, an adhesive is employed to join the valve 40 and the reinforcement plate 42.

In the present embodiment, for example, fluorine-based elastomer (manufactured by Shin-Etsu chemical industry Co., Ltd.) may be employed as the adhesive.

As illustrated in FIGS. 6C and 6D, a predetermined gap is formed between the reinforcement plate 42 and the needle 310. Such a configuration as described above allows the adhesive of the adhesive layer 43, which joins the valve 40 and the reinforcement plate 42 together, not to adhere to or contact the needle 310.

For this reason, preferably, the inner diameter of the needle hole 422 that is formed in the reinforcement plate 42 through which the needle 310 is inserted, is set to a size such that the adhesive does not adhere to the needle 310.

In the present embodiment, the inner diameter of the needle hole 422 is set to φ 2.5 mm which corresponds to 250% of φ 1 mm, which is the outer diameter of the needle 310.

As illustrated in FIGS. 6B and 6D, the reinforcement plate 42 includes assembly screw holes 421 into which assembly screws 3021 are inserted.

In the present embodiment, the assembly screws 3021 serves as a fastening member to fasten the sealing member 41 sandwiched between the nozzle-side housing 301 and the needle-side housing 302 as illustrated in FIGS. 5A and 5B.

When the sealing member 41 is replaced, as illustrated in FIG. 5C, the assembly screws 3021 are loosened. By so doing, the sealing member 41 can be replaced. Holes into which the assembly screws 3021 are inserted, are also formed in the valve 40, and are disposed at positions corresponding to the assembly screw holes 421. The holes into which the assembly screws 3021 are inserted are blind holes.

In the present embodiment, such a configuration as described above allows the sealing member 41 to prevent the liquid, i.e., ink, from flowing out from the inside of the nozzle-side housing 301 to the needle-side housing 302. In the comparative example, the O-ring 34 that serves as the housing sealing member is disposed at the joint between the first housing 11*a* and the second housing 11*b* in the driving unit. However, for the above-described reason, such a configuration is not necessary in the present embodiment.

In addition, the sealing member 41 partitions the nozzle-side housing 301 and the needle-side housing 302. However, the needle 310 and the valve 40 are not bonded to each other, or even if the needle 310 and the valve 40 are bonded to each other, the needle 310 and the valve 40 are weakly bonded to each other as described in another embodiment, i.e., a fifth embodiment, to be described below. Accordingly, the needle 310 and the valve 40 can be separated from each other by applying a force.

Accordingly, the nozzle-side housing 301 and the needle-side housing 302 can be attached to and detached from the housing of the liquid discharge head 10. Accordingly, only the sealing member 41 can be replaced as illustrated in FIG. 5C. As described above, only the sealing member 41 can be replaced. Accordingly, the cost of the liquid discharge head 10 can be reduced compared with a case in which the entire liquid discharge head 10 is replaced. In addition, the operational life of the liquid discharge head 10 to discharge liquid can be prolonged.

Stretching of the valve 40 is described in detail below. In the present embodiment, when the valve 40 is used for a long time, permanent strain of the valve 40 may be generated due to compression and stretching of the material employed for the valve 40. Accordingly, the degree of recovery of the valve 40 may be reduced. For this reason, an opening amount of the valve 40 may be reduced when the valve 40 is opened. For this reason, preferably, the valve 40 is stretched.

Alternatively, if the stretch amount of the valve 40 is too large, for example, the valve 40 may rupture, a load may be applied to the driving unit when the driving unit presses the valve 40, or the reinforcement plate 42 may be deformed. Accordingly, preferably, the stretch amount of the valve 40 is designed in consideration of the above-described problems.

In the present embodiment, the valve 40 is stretched to 0 to 300% after the valve 40 is attached. The stretch amount of the valve 40 at which the valve 40 may rupture varies depending on a rubber material employed for the valve 40. However, the stretch amount of the valve 40 at which the valve 40 may rupture is approximately 300%. Preferably, the percentage of the stretch amount of the valve 40 is equal to or smaller than the stretch amount of the valve 40 at which the valve 40 may rupture.

Preferably, the stretch amount to be used for the valve 40 of the reinforcement plate 42 is 5 to 100%. In the present embodiment, a material that may rupture when the stretch amount of the material reaches 220% is employed for the valve 40. The inner diameter of the needle hole 422 is φ 2.5 mm and the stretch amount of the valve 40 is 73%.

In addition, in any case, a pressing load that is applied to the reinforcement plate 42 is set to be equal to or smaller than IN, which is considered to have little influence on the deformation of the reinforcement plate 42. The details with respect to the stretch amount of the valve 40 are described in the fifth embodiment below. However, when the needle 310 and the valve 40 are bonded to each other by an adhesive, the stretch amount of the valve 40 may be 0%.

In addition, when no adhesive is employed between the needle 310 and the valve 40, preferably, the valve 40 is stretched. It is because the valve 40 can be opened and closed even when the stretch amount of the valve 40 is 0%. However, when the valve 40 is stretched, the valve 40 serves as a spring. Accordingly, an advantageous effect in which the conformability of the valve 40 is improved when the valve 40 is opened, can be obtained.

TABLE 1

| Diameter of Hole of Rein-forcement Plate mm | WHEN NEEDLE IS INSERTED Pressing Load (N) | WHEN NEEDLE IS INSERTED Stretch Amount (%) | WHEN NEEDLE IS OPERATED Bending Amount (mm) | WHEN NEEDLE IS OPERATED Stretch Amount (%) |
|---|---|---|---|---|
| 1.5 | | | 0.02 | 2 |
| 2.0 | 0.23 | 120 | 0.14 | 14 |
| 2.5 | 0.10 | 73 | 0.47 | 59 |
| 3.0 | 0.06 | 40 | 0.5 | 60 |
| 3.5 | 0.01 | 20 | 0.5 | 60 |

The stretch amounts of the valve 40 in each condition are indicated in Table 1. The numerical values indicated in the Table 1 are obtained by specific experiments and are examples.

Figure 7B:
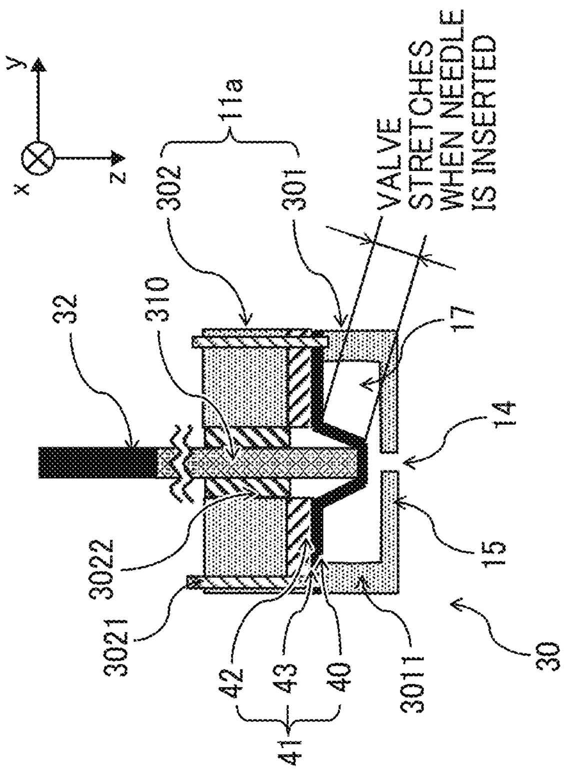
FIGS. 7A and 7B are cross-sectional views of a liquid discharge module when the valve is bent or stretched, according to an embodiment of the present disclosure.
Figure 7A:
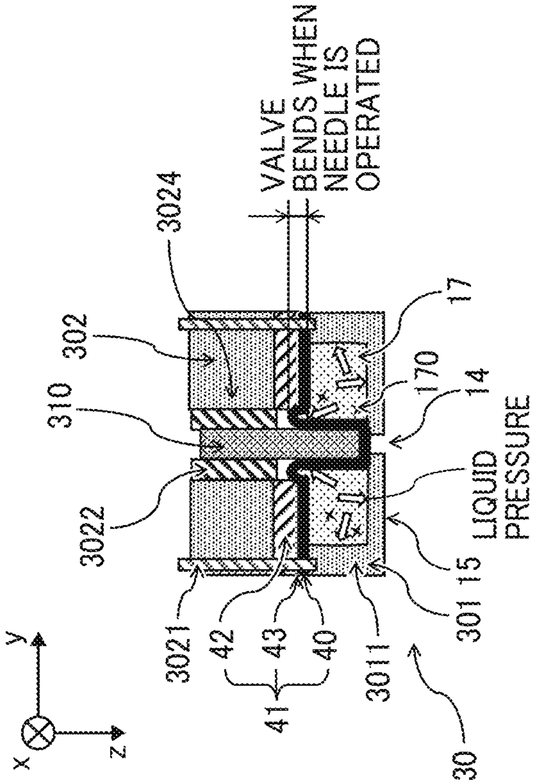

FIGS. 7A and 7B are cross-sectional views of the liquid discharge module 30 when the valve 40 bends or stretches, respectively. First, when the needle 310 is operated, a fluid pressure of 0.5 MPa, which is indicated by blank arrows in FIG. 7A, is applied to the valve 40. Accordingly, the valve 40 bends toward the driving device as illustrated in FIG. 7A. At that time, the valve 40 bends by about 0.5 mm, and the percentage of the stretch amount of the valve 40 is about 60%.

At this time, the reinforcement plate 42 bends by the fluid pressure. However, the reinforcement plate 42 is disposed in contact with the needle-side housing 302 closer to the driving device. Accordingly, the amount of bending of the reinforcement plate 42 can be reduced.

When the needle hole 422 has a hole size of φ 3 mm, the percentage of the stretch amount of the valve 40 is reduced to 40% when the needle 310, i.e., the needle pin, illustrated in FIG. 7B, is inserted. Accordingly, the valve 40 bends by equal to or greater than 1 mm by the fluid pressure when the needle 310 is operated as illustrated in FIG. 7A.

In the present embodiment, the reinforcement plate 42 has a thickness of 0.5 mm. However, the reinforcement plate 42 is disposed in contact with the needle-side housing 302. Accordingly, the valve 40 does not bend more than by 0.5 mm. The percentage of the stretch amount of the valve 40 is fixed at about 60%.

When the inner diameter of the needle hole 422 is set to 150% of the outer diameter of the needle 310, in other words, the inner diameter of the needle hole 422 is 1 mm and the outer diameter of the needle 310 is 1.5 mm, the above-described function can be performed.

By contrast, in such a case, the percentage of the stretch amount of the valve 40 is 220%, which exceeds the stretch amount of the valve 40 at which the valve 40 may rupture. For this reason, the types of the material that can be employed for the valve 40 may be limited.

Method of Replacing Sealing Member

FIGS. 8A, 8B, 8C, and 8D are diagrams each illustrating a method of replacing a sealing member 41A. In the present embodiment, the methods of replacing the sealing member are described with reference to FIGS. 8A, 8B, 8C, and 8D.

In FIGS. 8A, 8B, 8C, and 8D, blank arrows in broken lines indicate a direction in which the sealing member 41A is detached, and black arrows indicate a direction in which the sealing member 41A is attached.

Figures 8A, 8B, 8C, 8D:
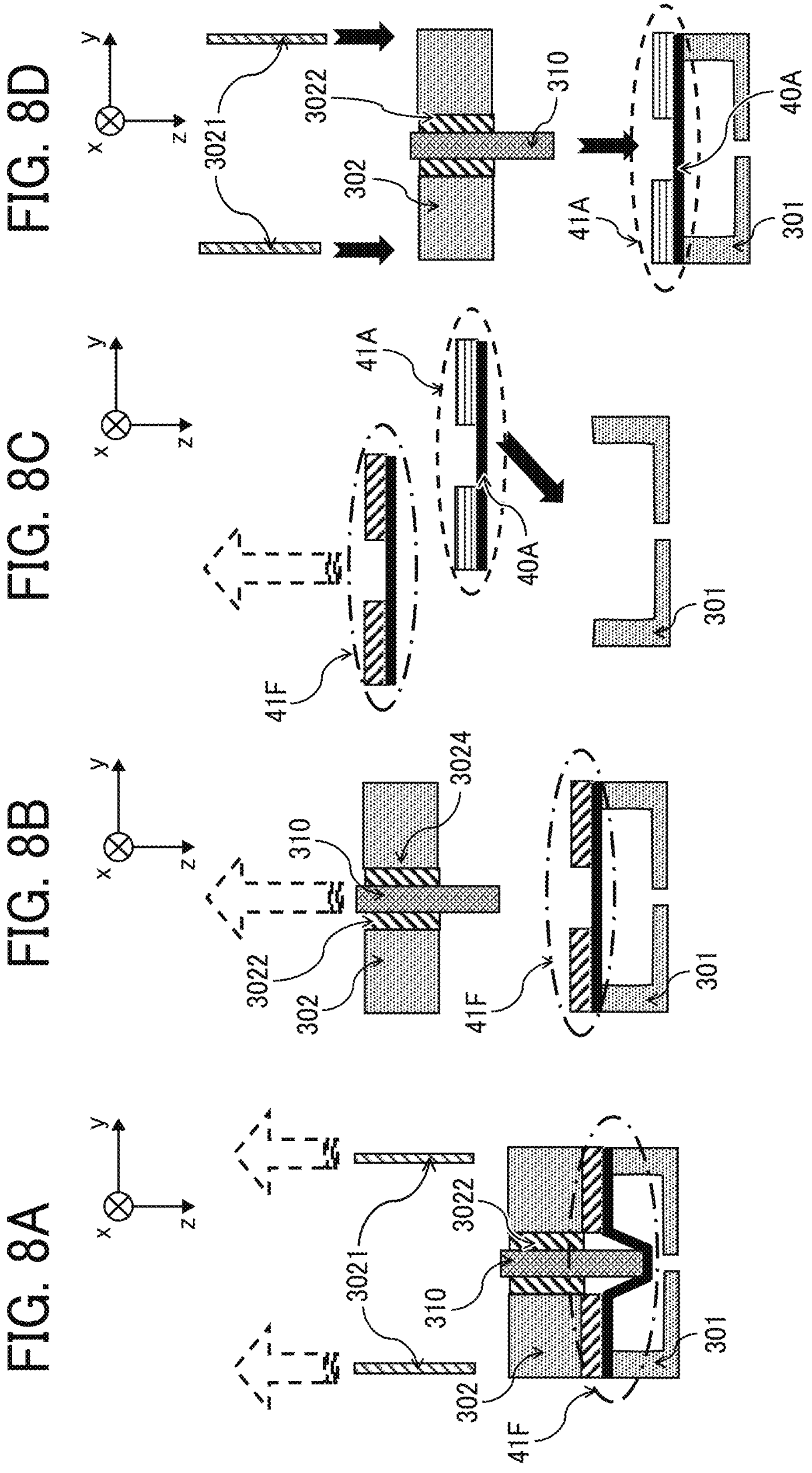
FIGS. 8A, 8B, 8C, and 8D are diagrams each illustrating a method of replacing a sealing member, according to an embodiment of the present disclosure.

First, as illustrated in FIG. 8A, the assembly screws 3021 that fasten the nozzle-side housing 301 and the needle-side housing 302 are loosened. In so doing, the assembly screws

3021 can be removed from the nozzle-side housing 301 and the needle-side housing 302. Thus, the nozzle-side housing 301, the sealing member 41A, and the needle-side housing 302 can also be separated into three individual components.

Subsequently, the assembly screws 3021 are removed as illustrated in FIG. 8A. Then, the needle-side housing 302 is detached as illustrated in FIG. 8B.

At this time, the needle 310 can also be removed. Then, when the needle-side housing 302 is detached, as illustrated in FIG. 8C, a sealing member 41F to be replaced as a used sealing member can be removed.

Then, when the used sealing member 41F is removed, the new sealing member 41A is attached to the nozzle-side housing 301. At this time, a valve 40A of the sealing member 41A contacts the nozzle-side housing 301.

Such a configuration as described above allows the sealing member 41A to be sandwiched between the nozzle-side housing 301 and the needle-side housing 302. Then, fastening the assembly screws 3021 allows the ink to be sealed. Accordingly, liquid, i.e., ink can be prevented from leaking.

Subsequently, as illustrated in FIG. 8D, the needle-side housing 302 is attached. Then, the sealing member 41A, the nozzle-side housing 301, and the needle-side housing 302 are fastened with the assembly screws 3021. By so doing, the replacement operation of the sealing member 41A is completed.

Such a configuration as described above allows only the sealing member 41A to be replaced. Accordingly, the replacement of the sealing member 41A is facilitated in the present embodiment compared to the comparative example. In addition, the cost of the sealing member is only necessary as the cost of a component to be replaced.

Second Embodiment

Figure 9A:
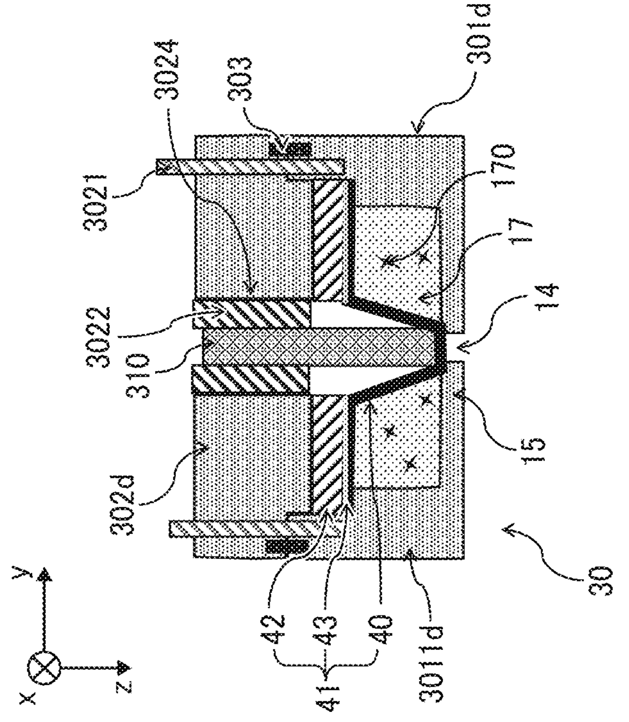
FIGS. 9A and 9B are cross-sectional views of a liquid discharge module according to a second embodiment of the present disclosure.
Figure 9B:
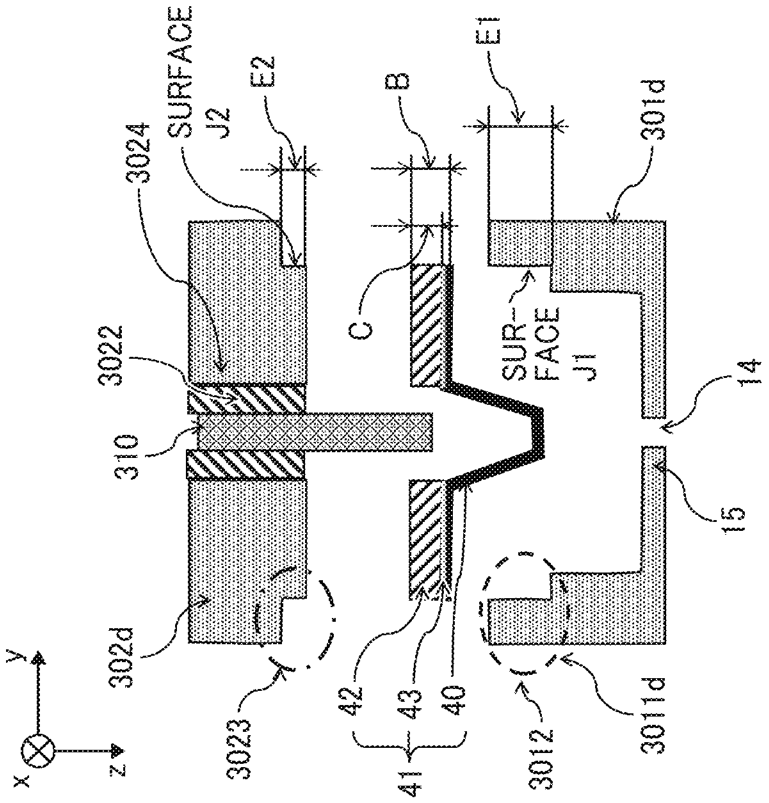

FIG. 9A is a cross-sectional view of the liquid discharge module 30 according to the second embodiment. FIG. 9B is an exploded view of the liquid discharge module 30 when a nozzle-side housing 301*d*, a sealing member 41, and a needle-side housing 302*d* are separated.

In the present embodiment, the shapes of the nozzle-side housing 301*d* and the needle-side housing 302*d* are different from the nozzle-side housing 301 and the needle-side housing 302 of the first embodiment. The other configurations of the present embodiment are similar to the configuration of the first embodiment. The shapes of the nozzle-side housing 301*d* and the needle-side housing 302*d* are described below.

First, in the present embodiment, as illustrated in FIG. 9B, steps, i.e., a step 3012 and a step 3023 are disposed on the nozzle-side housing 301*d* and the needle-side housing 302*d*, respectively. The configuration of the present embodiment is different from the configuration of the first embodiment in this respect.

Specifically, the outer perimeter of the liquid discharge module 30, which includes the channel 17, i.e., the liquid chamber and the driving unit, includes multiple steps.

Accordingly, the sealing member 41 is sandwiched between a surface J1 of the nozzle-side housing 301*d* and a surface J2 of the needle-side housing 302*d*, which are inner steps of the multiple steps.

In the present embodiment, the multiple steps include two steps. However, the multiple steps may include three or more than three steps. Further, in the present embodiment, the step 3012 and the step 3023 are formed on both the nozzle-side housing 301*d* and the needle-side housing 302*d*, respectively. However, embodiments of the present disclosure are not limited to such a configuration, and only one of the nozzle-side housing 301*d* and the needle-side housing 302*d* may include the step 3012 and the step 3023, respectively.

As illustrated in FIG. 9B, when the size of the surface J1, i.e., the length of the surface J1 of the step 3012 of the nozzle-side housing 301*d* in a direction in which the driving unit reciprocates, is E1 and the size of the surface J2, i.e., the length of the surface J2 of the step 3023 of the needle-side housing 302*d* in the direction in which the driving unit reciprocates, is E2, E is equal to E1 minus E2 (E=E1−E2).

In the present embodiment, E1 is greater than E1 (E1>E2). Embodiments of the present disclosure can be applied to even a configuration in which E1 is smaller than E2. The total thickness of the valve 40, the reinforcement plate 42, and the adhesive layer 43 is B, and the thickness of the reinforcement plate 42 is C.

At this time, E is greater than C and smaller than B. Accordingly, C is smaller than E and E is smaller than B ($C<E<B$). Alternatively, C, E, and B have a relation as in the formula given below. $C<E<B-[(B-C)\times(5\text{ to }50\%)]$.

The method of assembling the sealing member 41, the nozzle-side housing 301*d*, and the needle-side housing 302*d* is described below. First, the sealing member 41 is interposed between the inner steps, i.e., the step 3012 and the step 3023 of the nozzle-side housing 301*d* and the needle-side housing 302*d*, respectively. Subsequently, the step 3012 and the step 3023 are combined and fitted, such that the inner surfaces of the steps, i.e., the surface J1 and the surface J2, of the nozzle-side housing 301*d* and the needle-side housing 302*d*, respectively, contact each other. Then, positioning pins 303 are inserted and the nozzle-side housing 301*d* and the needle-side housing 302*d* are fastened by the assembly screws 3021.

The liquid discharge module 30 after the sealing member 41, the nozzle-side housing 301*d*, and the needle-side housing 302*d* are assembled is illustrated in FIG. 9A. At this time, C is smaller than E and E is smaller than B ($C<E<B$). By so doing, a pressing and compression force is applied to the reinforcement plate 42. Such a configuration as described above allows the valve 40 of the sealing member 41 to be deformed such that the valve 40 closely contacts the nozzle-side housing 301*d*. Accordingly, a sealing effect can be obtained.

Outer steps of the nozzle-side housing 301*d* and outer steps of the needle-side housing 302*d* contact each other. By so doing, the driving unit is positioned in the direction in which the driving unit reciprocates, i.e., the vertical direction in FIG. 9A, i.e., the z direction.

In the first embodiment, it is preferable that the driving unit reciprocates to adjust the flow rate of the liquid after the sealing member 41 is replaced. In addition, preferably, the change of the elasticity of the valve 40 is considered.

By contrast, in the second embodiment, the driving unit is positioned in the z direction as described above. Accordingly, the sealing member 41, the nozzle-side housing 301*d*, and the needle-side housing 302*d* can be assembled after the sealing member 41 is replaced, without the driving unit being reciprocated to adjust the flow rate of the liquid. As a result, the flow rate of the liquid discharged from the nozzle 14 can be stabilized. As described above, the adjustment of the flow rate of the liquid is not necessary in the second embodiment. Accordingly, the cost of the adjustment can be reduced, and the use of ink which is consumed during the adjustment is not necessary. Thus, it is possible to contribute to the saving of resources.

The positioning of the driving unit in a direction orthogonal to the direction in which the driving unit reciprocates, i.e., the right-left direction and the y direction in FIG. 9A, is typically performed by the positioning pins 303 illustrated in FIG. 9A.

In the present embodiment, only the sealing member 41 is replaced and the nozzle-side housing 301*d* and the needle-side housing 302*d* are reused. Accordingly, the position adjustment of the driving unit in the direction orthogonal to the direction in which the driving unit reciprocates may not be needed. The step 3012 and the step 3023 can be aligned also in the direction orthogonal to the direction in which the driving unit reciprocates.

In the present embodiment, in the experiment, it was found that favorable sealing performance can be obtained by setting the compression ratio of the valve 40, when the valve 40 is deformed by the pressing force, to a value of 5 to 50%. For example, if the compression ratio of the valve 40 is smaller than 5%, some foreign matter may be mixed into the liquid chamber. Accordingly, a gap may be formed. As a result, the sealing property of the valve 40 may deteriorate.

In addition, when the valve 40 is deformed to such an extent in which the compression ratio of the valve 40 exceeds 50%, the nozzle-side housing 301*d* or the needle-side housing 302*d* may be deformed. As a result, the position of the valve 40 may be shifted. For this reason, the compression ratio of the valve 40 is set to the above-described values. The compression ratio of the valve 40 is preferably set to a value of 10 to 30%.

Another reason for setting the compression ratio of the valve 40 to the above-described values is described below. In the comparative example as illustrated in FIG. 4B, the O-rings 34 are employed. However, in the present embodiment, the O-rings 34 are not employed. For this reason, even in the present embodiment in which the O-rings 34 are not employed, preferably, the position of the sealing member 41 is designed such that a pressing force similar to the pressing force in the comparative example is obtained.

Accordingly, in the present embodiment, the compression ratio of the valve 40 is set to the above-described values. By so doing, a pressing force similar to the pressing force in the comparative example is obtained.

In the present embodiment, the number of assembly steps is smaller compared to a third embodiment to be described below. In addition, the assembly of the sealing member 41, the nozzle-side housing 301*d*, and the needle-side housing 302*d* can be performed only in the direction in which the needle 310 reciprocates. Accordingly, the assembly operation can be simplified. As a result, the cost of the liquid discharge module 30 can be reduced.

Third Embodiment

Figure 10:
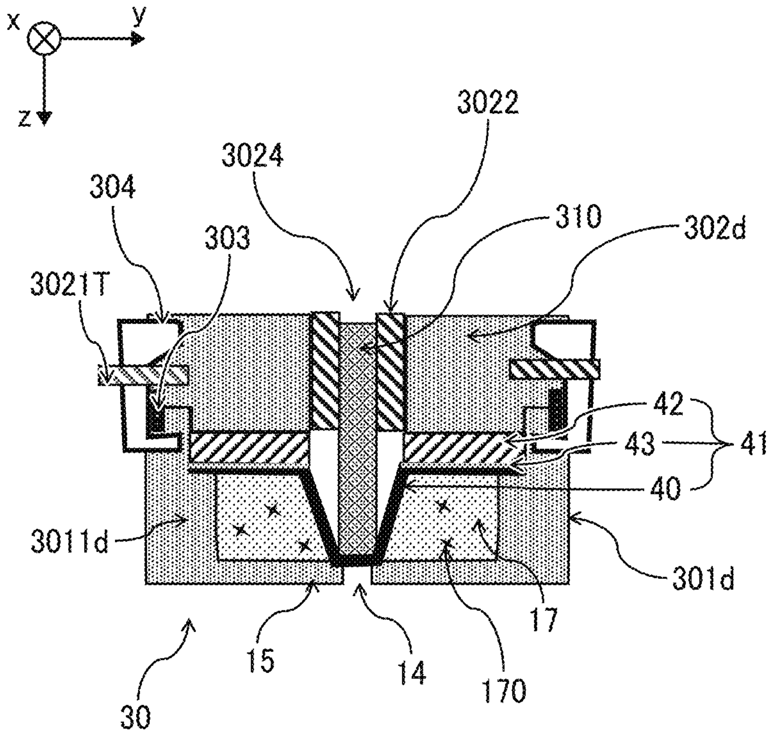
FIG. 10 is a cross-sectional view of a liquid discharge module according to a third embodiment of the present disclosure.

FIG. 10 is a cross-sectional view of the liquid discharge module 30 according to the third embodiment of the present disclosure. The third embodiment is different from the second embodiment in that a fastening method is added in the third embodiment.

Other components of the third embodiment are similar to the components of the second embodiment. Accordingly, the difference between the third embodiment and the second embodiment is described below.

In the present embodiment, the nozzle-side housing 301*d* and the needle-side housing 302*d* include the step 3012 and the step 3023, respectively. In addition, the nozzle-side housing 301*d* and the needle-side housing 302*d* are positioned by the positioning pins 303. Further, the nozzle-side housing 301*d* and the needle-side housing 302*d* are fastened by clamps 304 and tightened by assembly screws 3021T. The assembly screws 3021T fasten the nozzle-side housing 301*d* and the needle-side housing 302*d* in the direction orthogonal to the direction in which the needle 310 reciprocates.

The clamps 304 fasten the nozzle-side housing 301*d* and the needle-side housing 302*d* in the direction in which the needle 310 reciprocates. In FIG. 10, the nozzle-side housing 301*d* and the needle-side housing 302*d* are fastened by the clamps 304 and tightened by the assembly screws 3021T.

In the present embodiment, in the nozzle-side housing 301*d*, the needle 310 moves by only about 1 mm in the z direction. In addition, the nozzle-side housing 301*d* includes the channel 17 as the liquid chamber through which ink as liquid flows. Accordingly, the degree of freedom of positions at which the assembly screws 3021T are fastened is small in the design of the nozzle-side housing 301.

For this reason, as illustrated in FIG. 9A, the screw holes are formed, at which the assembly screws 3021T are screwed, on the needle-side housing 302*d*. Accordingly, the nozzle-side housing 301*d* and the needle-side housing 302*d* are fastened by the clamps 304. As a result, a space on which the assembly screws 3021T are screwed is secured on the nozzle-side housing 301*d* and the size of the liquid discharge module 30 can be compact.

Reducing the size of the liquid discharge module 30 allows the weight of the liquid discharge module 30 to be reduced. As a result, the load that is applied to a driving apparatus, which moves the liquid discharge apparatus to discharge liquid, can be reduced.

Fourth Embodiment

Figure 11C:
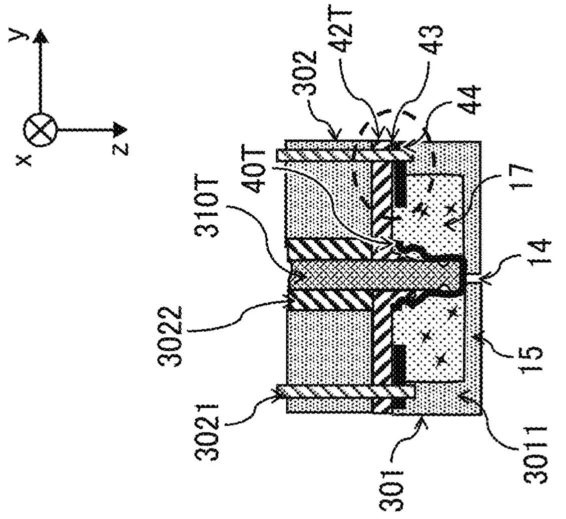
FIGS. 11B and 11C are cross-sectional views of a liquid discharge module including the sealing member and the valve of FIG. 11A, according to the fourth embodiment.
Figure 11B:
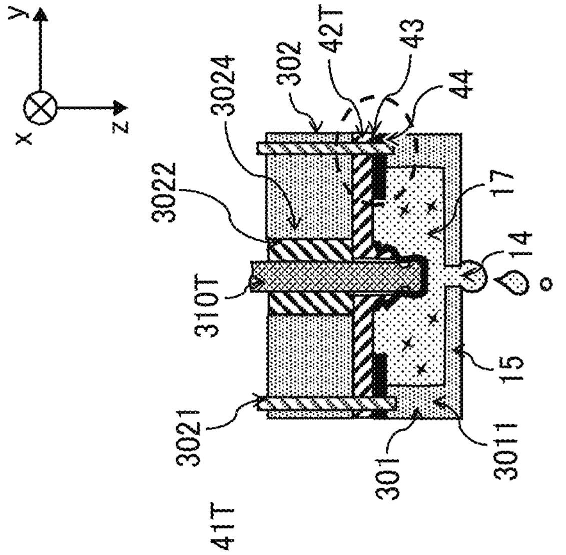
Figure 11A:
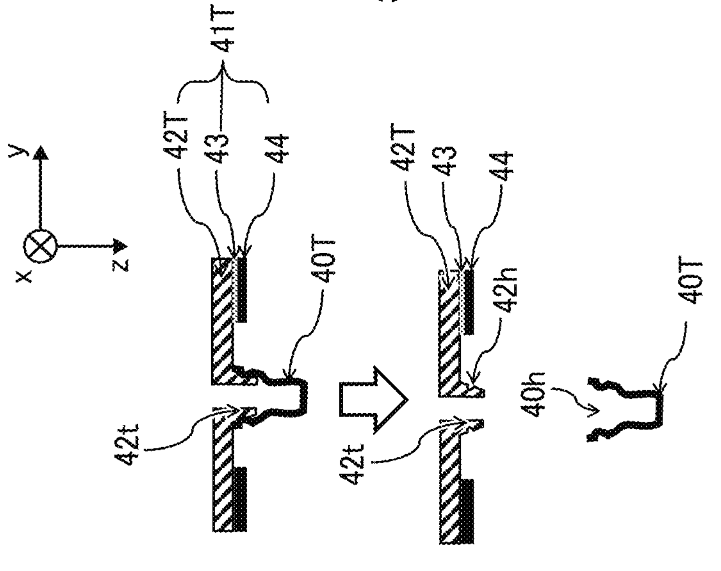
FIG. 11A is a cross-sectional view of a sealing member and a valve according to a fourth embodiment of the present disclosure.

FIG. 11A is a cross-sectional view of a sealing member 41T and a valve 40T according to a fourth embodiment of the present disclosure. FIGS. 11B and 11C are cross-sectional views of the liquid discharge module 30 including the sealing member 41T and the valve 40T.

FIG. 11A is a cross-sectional view of the sealing member 41T according to the present embodiment. FIG. 11B is a cross-sectional view of the liquid discharge module 30 when the sealing member 41T according to the fourth embodiment is mounted in the liquid discharge module 30 and the on-off valve 31 is opened.

FIG. 11C is a cross-sectional view of the liquid discharge module 30 when the sealing member 41T according to the fourth embodiment is mounted in the liquid discharge module 30 and the on-off valve 31 is closed.

Figure 12B:
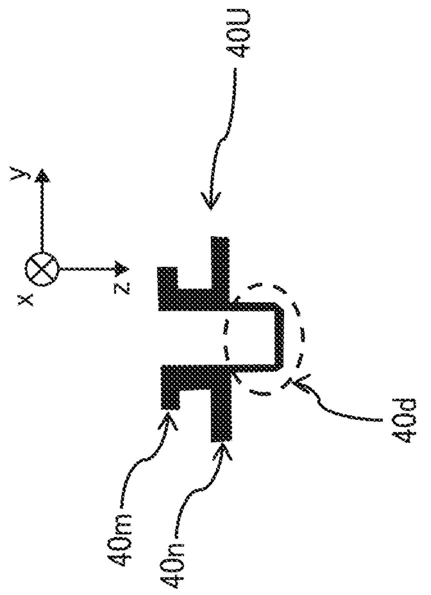
FIG. 12B is a cross-sectional view of the valve of FIG. 12A according to the fourth embodiment of the present disclosure.
Figure 12A:
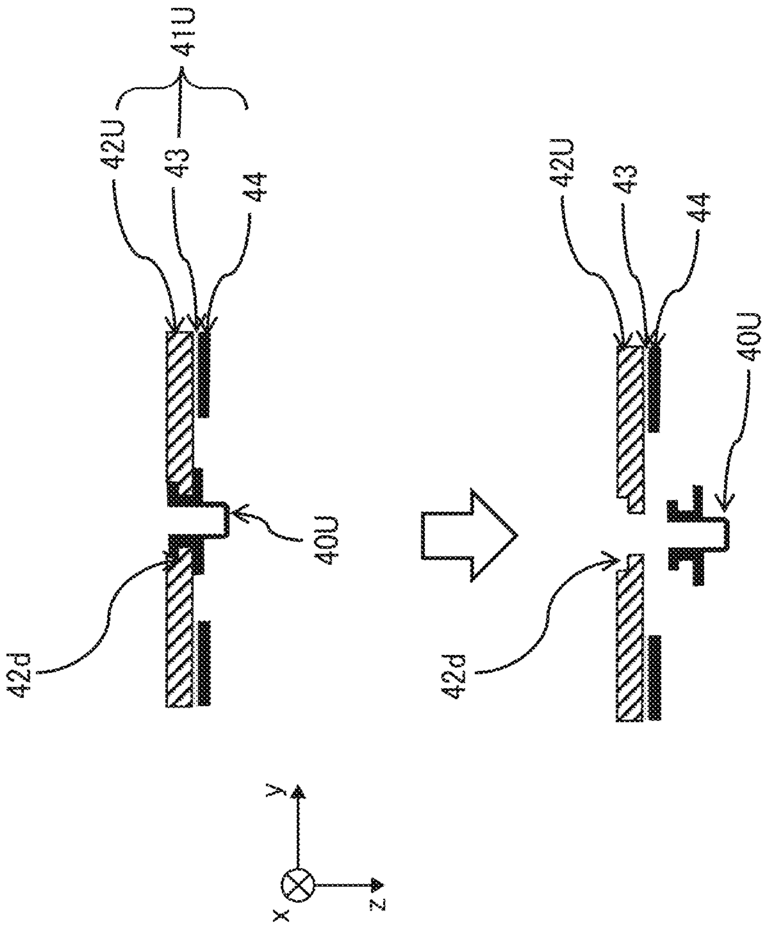
FIG. 12A is a diagram illustrating another sealing member and another valve according to the fourth embodiment.

FIG. 12A is a cross-sectional view of the sealing member 41U according to the present embodiment. FIG. 12B is a cross-sectional view of a valve 40U according to the present embodiment.

In the present embodiment, the sealing member 41U is different from the sealing member 41 of the first embodiment. Accordingly, the shape of a tip of a needle 310T is also different from the above-described embodiments, and a recess is formed in the tip of the needle 310T.

Other components of the present embodiment are similar to the components of the first embodiment. Accordingly, the sealing member 41U is described below. The sealing member 41U of the present embodiment includes a concave portion engageable with the valve 40U and a reinforcement plate 42U. The valve 40U and the reinforcement plate 42U engage with each other with the concave portion interposed between the valve 40U and the reinforcement plate 42U. By so doing, the valve 40U and the reinforcement plate 42U are integrated as a single component.

First, the sealing member 41T is described with respect to FIGS. 11A, 11B, and 11C.

The configuration in which the sealing member 41T is illustrated in FIGS. 11A, 11B, and 11C is referred to as a valve outer engagement configuration in the following description.

As illustrated in FIG. 11A, the reinforcement plate 42T of the sealing member 41T according to the valve outer engagement configuration includes a protruding portion 42*t*, which serves as a fitting portion, extending toward the nozzle 14. The protruding portion 42*t* includes a protruding portion dent 42*h* as a dent on a side surface of the protruding portion 42*t*. Accordingly, the reinforcement plate 42T includes a convex-concave portion having a concavo-convex shape.

The valve 40T also includes a concave-convex portion corresponding to the concave-convex shape of the convex-concave portion of the reinforcement plate 42T. The valve 40T includes a valve hole 40*h*, through which the needle 310T is inserted and is a portion into which the needle 310T is inserted as illustrated in FIGS. 11B and 11C. The inner diameter of the valve hole 40*h* is designed to be smaller than the outer diameter of the protruding portion 42*t* formed on the reinforcement plate 42T by about 10% in consideration of assembly operation.

Accordingly, the protruding portion 42*t* is press-fitted into the valve 40T. By so doing, the convex-concave portion of the protruding portion 42*t* and the convex-concave portion of the valve 40T are fitted together. The valve 40T and the reinforcement plate 42T are assembled while the valve 40T is pressed against the protruding portion 42*t* of the reinforcement plate 42T.

Such a configuration as described above allows only the valve 40T to be replaced when the sealing member 41T is replaced. Accordingly, the cost of the liquid discharge module 30 can be further reduced.

The inner diameter of the valve hole 40*h*, which is a hole of the valve 40T, is slightly smaller than the outer diameter of the protruding portion 42*t* formed on the reinforcement plate 42T. Accordingly, fastening force is applied when the valve 40T is engaged with the protruding portion 42*t*.

Such a configuration as described above achieves an effect in which the valve 40T is less likely to come off from the reinforcement plate 42T. In addition, the protruding portion 42*t* includes the convex-concave portion on the side surface of the protruding portion 42*t*. Accordingly, the valve 40T is more unlikely to come off from the reinforcement plate 42T.

Subsequently, the sealing member 41T and the valve 40U are described with respect to FIGS. 12A and 12B.

The configuration of the sealing member 41T and the valve 40U illustrated in FIGS. 12A and 12B is referred to as a valve inner engagement configuration.

First, as illustrated in FIG. 12A, each of the reinforcement plates 42U includes a recessed portion and has a stepped shape, i.e., a concave-convex shape when viewed from a direction orthogonal to the direction in which the needle 310 is reciprocated, such that the two reinforcement plates 42U protrude at positions facing each other. The above-described stepped shape is referred to as a reinforcement-plate step 42*d* in the following description.

As illustrated in FIG. 12B, the valve 40U includes a valve cylindrical portion 40*d*, which is a recessed portion into which the reinforcement plate 42U is fitted. The needle 310T is inserted into the valve cylindrical portion 40*d*. The inner diameter of the reinforcement-plate step 42*d* is φ 1.6 mm. The outer diameter of the recessed portion of the valve cylindrical portion 40*d* is larger than the inner diameter of the reinforcement-plate step 42*d* by about 10%, which is φ 1.76 m.

The inner diameter of the reinforcement-plate step 42*d* is 1 mm. The depth of the valve cylindrical portion 40*d*, i.e., the depth of reciprocation by the needle 310*d*, is set to 0.9 mm. The depth of the valve cylindrical portion 40*d* is shorter than 1 mm, which is the amount of protrusion of the needle 310T, by about 10%. The reinforcement plate 42U is press-fitted into the valve 40U including the valve cylindrical portion 40*d* to be engaged with and assembled with the valve 40U. Thus, the sealing member 41U according to the present embodiment is assembled.

As illustrated in FIG. 12B, the valve 40U includes a pair of flanges arranged in a vertical direction, i.e., a direction in which the needle 310T reciprocates. The upper flange is an upper flange 40*m*, and the lower flange is a lower flange 40*n*. The distance between the upper flange 40*m* and the lower flange 40*n* is about 10% smaller than the thickness, which is 0.3 mm, of the step of the reinforcement plate 42U.

The distance between the upper flange 40*m* and the lower flange 40*n* is 0.27 mm. In the present embodiment, the reinforcement plate 42U is sandwiched between the upper flange 40*m* and the lower flange 40*n*.

The length of the upper flange 40*m* in the y direction is 0.4 mm, which is smaller than half of the inner diameter of the valve cylindrical portion 40*d*. The reinforcement plate 42U is sandwiched between the upper flange 40*m* and the lower flange 40*n* formed on the valve 40U. Accordingly, the valve 40U is prevented from being pulled out from the reinforcement plate 42U when the valve 40U is pressed by the pressing force of the needle 301T or the fluid pressure of the ink.

Such a configuration as described above allows only the valve 40U to be replaced when the sealing member 41U is replaced. Accordingly, the cost of the liquid discharge module 30 can be further reduced. In addition, the distance between the upper flange 40*m* and the lower flange 40*n* is smaller than the thickness of the reinforcement plate 42U. Accordingly, a force that fastens the reinforcement plate 42U is generated. As a result, a sealing effect by such a force can be obtained.

Further, the length of the upper flange 40*m* in the y direction is smaller than half of the inner diameter of the valve cylindrical portion 40*d*. Accordingly, the valve 40U can be inserted into and removed from the hole of the reinforcement plate 42U while being deformed when the valve 40U is replaced. In addition, the depth of the valve cylindrical portion 40*d* is smaller than the amount of protrusion of the needle 310T. Accordingly, a tensile load can be obtained. As a result, the valve cylindrical portion 40*d* can follow the reciprocating movement of the needle 310T.

Such a configuration as described above allows, in the present embodiment, the valve 40U to be disposed only in the vicinity of the nozzle 14, both in the valve outer engagement configuration and the valve inner engagement configuration.

In the present embodiment, if there is no liquid leakage in a portion, i.e., a portion surrounded by a circle indicated by a broken line in FIGS. 11B and 11C, in which the reinforcement plate 42T of the sealing member 41T is interposed between the nozzle-side housing 301 and the needle-side housing 302, there is no need to take a countermeasure.

When the occurrence of ink leakage is taken into consideration, preferably a configuration in which sealing is performed to prevent liquid leakage is adopted. In such a case, for example, the sealing member 44 that is made of a material similar to the valve 40T is disposed at the portion surrounded by the circle indicated by the broken line in FIGS. 11B and 11C to seal the portion.

Further, embodiments of the present disclosure are not limited to such a configuration. However, a member made of a material different from the material employed for the valve 40U, such as packing, may be disposed to seal the portion.

Fifth Embodiment

Figure 13B:
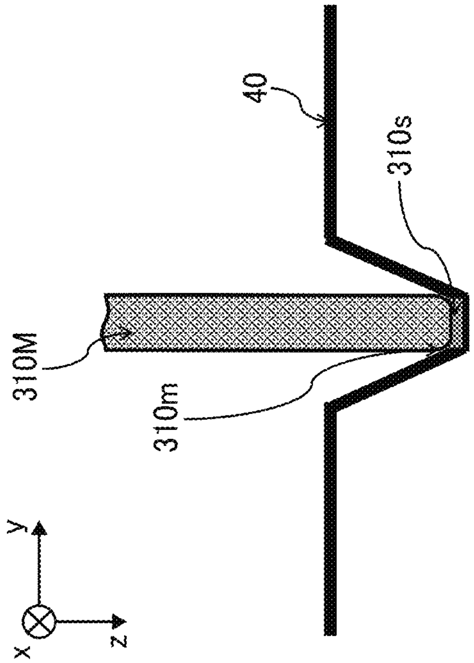
FIG. 13B is a diagram illustrating the needle of FIG. 13A when the needle contacts a valve.
Figure 13A:
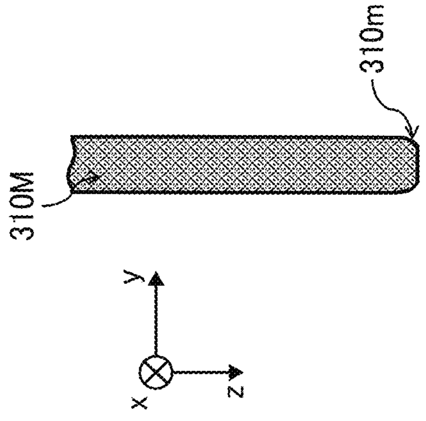
FIG. 13A is a diagram illustrating a needle according to a fifth embodiment of the present disclosure.

FIG. 13A is a diagram illustrating a needle 310M according to a fifth embodiment of the present disclosure. FIG. 13B is a diagram illustrating the needle 310M when the needle 310M contacts the valve 40. In the present embodiment, the shape of the needle 310M is different from the shape of the needle 310 of the first embodiment. Other components of the present embodiment are similar to the components of the first embodiment. The shape of the needle 310M is described below.

The needle 310*m* of the present embodiment includes a tip having a shape in which a corner portion of the tip is rounded. Such a configuration as described above can reduce the concentration of stress applied to the valve 40 from the needle 310M. In other words, the stress that is applied to the valve 40 from the needle 310M is relieved. Accordingly, for example, cracks due to the concentration of the stress can be prevented from being generated and the wear characteristics of the valve 40 are enhanced.

An intermediate layer 310*s* such as a high-viscosity liquid, which is an example of liquid substance, or an adhesive may be interposed between the needle 310M and the valve 40. The needle 310M and the valve 40 contact each other by the reaction of the valve 40. In other words, the needle 310M and the valve 40 contact each other by the contracting force of the valve 49. However, a portion of the valve 40 at which the needle 310M contacts the valve 40 slightly slides. Accordingly, the portion of the valve 40 is worn.

When the valve 40 is opened, the valve 40 and the nozzle-side housing 301 are affected by the vacuum force. Accordingly, the valve 40 is inhibited from opening, in other words, opening of the valve 40 is delayed. For this reason, the intermediate layer 310*s* is interposed between the needle 310M and the valve 40 to prevent the opening of the valve 40 from being delayed.

In the present embodiment, the intermediate layer 310*s* is a high-viscosity liquid. Examples of liquid that may serve as the intermediate layer 310*s* include, for example, water or a lubricant such as silicone oil or grease having a small frictional resistance. In consideration of maintenance, preferably, a non-volatile material is employed for the intermediate layer 310*s*. More preferably, grease having a high boiling point is employed for the intermediate layer 310*s*.

The effect that is obtained when a high-viscosity liquid is employed as the intermediate layer 310*s* is described below. At a contact point, which is irregularities of the surface layer of the valve 40, between the tip of the needle 310M and the valve 40, frictional heat is likely to be generated when the tip of the needle 310M and the valve 40 slide each other. For this reason, the valve 40 which is formed of rubber-based material may deteriorate. When the liquid is interposed between the needle 310M and the valve 40, the needle 310M and the valve 40 contact each other with surface contact via the liquid.

Further, the heat conduction is enhanced by the presence of the liquid between the needle 310M and the valve 40 to diffuse the heat, i.e., the temperature rise can be prevented. Accordingly, the frictional heat can be reduced. In addition, the needle 310M and the valve 40 can be prevented from separating each other.

When an adhesive is employed for the intermediate layer 310*s*, specific examples of the adhesive include adhesives described below. First, the material employed for the needle 310M is stainless steel, which has the strength of 520 MPa. The material employed for the valve 40 is FFKM (perfluororubber) which has the strength of 15 MPa. For this reason, an adhesive having a low strength and a low adhesive strength such as fluoroelastomer manufactured by Shin-Etsu chemical industry, having the strength of 3.2 MPa, and the adhesive strength of 1.8 MPa to stainless steel, may be employed. The fluoroelastomer is employed because the valve 40 and the adhesive can be peeled off from the needle 310M without destroying the needle 310M and the valve 40.

Further, the adhesive strength of the fluoroelastomer is equal to or greater than 0.1 MPa. Accordingly, the occurrence of peeling off of the valve 40 from the needle 310M due to the vacuum force at a moment at which the valve 40 is opened, can be prevented. The adhesive may have an adhesive strength, which is equal to or greater than 0.1 MPa, at which the material of the needle 310M and an adhesive strength, which is equal to or greater than −0.1 MPa, at which the material of the valve 40 does not peel off due to the vacuum force. In addition, an adhesive that is dissolved in a solvent or a hot-melt adhesive that is dissolved by heat may be employed.

When the intermediate layer 310*s* is employed as the adhesive, the following advantages can be obtained. The tip of the needle 310M and the valve 40 are joined by the adhesive. Accordingly, friction is less likely to be generated. For this reason, frictional heat can be prevented from being generated. In addition, the needle 310M and the valve 40 are joined. Accordingly, the needle 310M and the valve 40 are prevented from separating from each other.

Further, the valve 40 is made of rubber, and heat is generated when the valve 40 made of rubber expands and contracts. However, the generated heat is likely to be absorbed due to the surface contact between the needle 310M and the valve 40. Most of the generated heat escapes to the liquid chamber and is thus absorbed. Accordingly, the generated heat does not affect the needle 310M and the valve 40.

Sixth Embodiment

Figure 14:
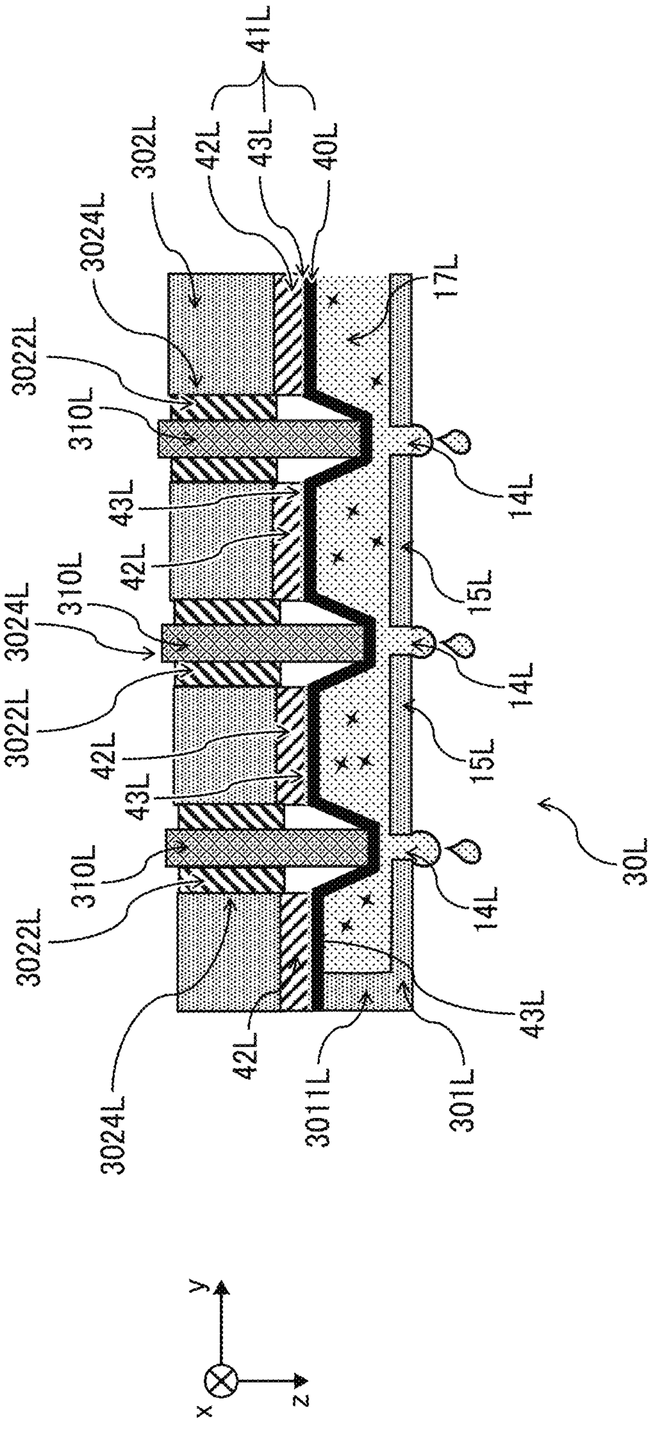
FIG. 14 is a cross-sectional view of a liquid discharge head according to a sixth embodiment of the present disclosure.

FIG. 14 is a cross-sectional view of a liquid discharge head 30L according to a sixth embodiment of the present disclosure. The liquid discharge head 30L according to the sixth embodiment is described in detail with respect to FIGS. 15A and 15B.

Figure 15A:
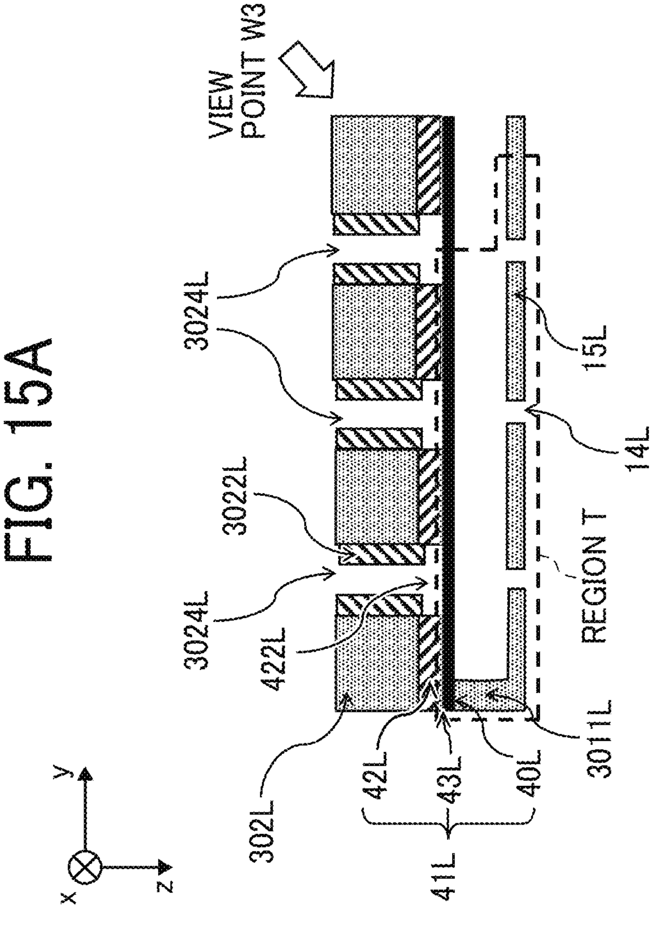
FIG. 15A is a cross-sectional view of a sealing member according to the sixth embodiment.
Figure 15B:
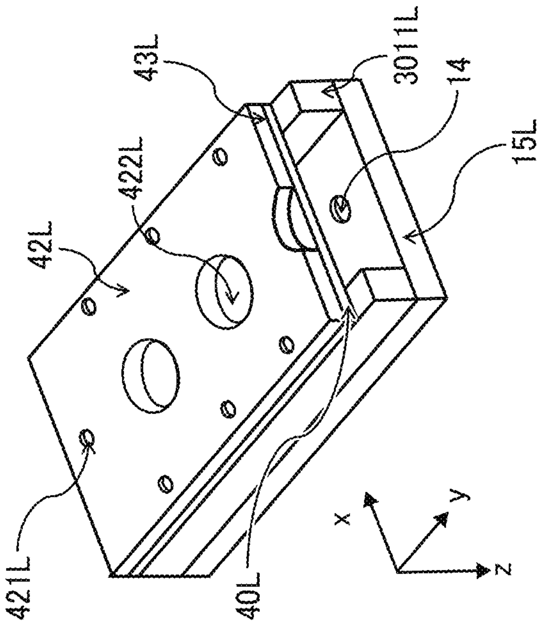
FIG. 15B is a perspective view of the sealing member of FIG. 15A.

FIG. 15A is a cross-sectional view of the liquid discharge head 30L according to the sixth embodiment. FIG. 15B is a perspective view of a region T of the liquid discharge head 30L, viewed from a viewpoint W3 in FIG. 15A.

In FIGS. 15A and 15B, the liquid discharge head 30L before the needle 310L is assembled with the liquid discharge head 30L, is illustrated. The liquid discharge head 30L according to the present embodiment has a shape, which may also be referred to simply as an array shape, in which multiple channels (CHs) are disposed in the liquid discharge head 30L. The liquid discharge head 30L is different from the liquid discharge head 10 of the first embodiment in this respect. Embodiments of the present disclosure can also be applied to a liquid discharge head having such an array shape. In the liquid discharge head 30L having the array shape, a sealing member 41L is connected and integrated with the multiple CHs.

Other components of the present embodiment are similar to the components of the first embodiment. Accordingly, the components of the liquid discharge head 30L that are different from the other embodiments are described below. The above-described array shape can be applied to the above-described first, second, third, fourth, and fifth embodiments.

First, as illustrated in FIG. 14, in the present embodiment, the liquid discharge head 30L includes the multiple driving units including nozzles 14L and the needles 310L. More specifically, the liquid discharge head 30L of the present embodiment includes a nozzle-side housing 301L and a needle-side housing 302L. The needle-side housing 302L includes a nozzle plate 15L including multiple nozzles 14L. The needle-side housing 302L includes multiple needles 310L and respective bearings 3022L.

Further, as illustrated in FIG. 14 or 15A, a valve 40L of the sealing member 41L does not individually correspond to each of the nozzles 14L or the needles 310L. However, the valve 40L is integrally connected with the multiple CHs as a single component.

As illustrated in FIG. 15B, a reinforcement plate 42L includes multiple holes 421L and multiple needle holes 422L. Assemble screws are screwed into the respective holes 421L to join the reinforcement plate 42L to the valve 40L via the adhesive layer 43L.

Such a configuration as described above in which the valve 40L of the sealing member 41L is integrally connected with the multiple CHs as a single component, allows the sealing member 41L to be replaced for all the CHs at once, instead of replacing the sealing member 41L for each of the CHs.

In embodiments of the present disclosure, in contrast to the array shape, for example, a configuration in which one needle is disposed relative to one nozzle as in the first embodiment, in other words, a configuration that is not an array shape is referred to as an individual unit shape. The array shape has the following advantages as compared with the individual unit shape. First, in the case of the individual unit shape, walls that individually partition liquid chambers, liquid chambers, and components for injecting liquid such as ink into the liquid chambers are disposed. As a result, the cost of the liquid discharge apparatus increases.

In addition, in the case of the individual unit shape, adjustment processes such as, for example, fastening with screws and positioning of components are needed. However, the cost of the adjustment processes further increases the cost of the liquid discharge apparatus in addition to the cost of the components. The cost increase of the liquid discharge apparatus is more remarkable in the case of the individual unit shape than in the case of the array shape.

In contrast, in the array shape, wall portions that individually partition liquid chambers are not necessary. In addition, it is sufficient that a single component for injecting liquid such as ink into the liquid chamber is disposed. Accordingly, the number of components can be reduced.

As described above, the number of components can be reduced. For this reason, the number of adjustment processes such as fastening with screws and positioning of the components can also be reduced. Accordingly, the cost of performing such processes can also be reduced.

In the case of the array shape in which the valve 40L is a single component, for example, when only a portion of the valve 40L is consumed, the whole valve 40L is replaced.

By contrast, the cost reduction that is achieved by reducing the number of components and reducing the number of adjustment processes is larger than the cost reduction achieved by replacing the valve 40L. Accordingly, the cost reduction is larger in the configuration according to the present embodiment.

Configuration of Liquid Discharge Apparatus

Subsequently, a liquid discharge apparatus according to an embodiment of the present disclosure is described with reference to the drawings. The above-described embodiments can be applied to the configuration of the liquid discharge apparatus described below. X, Y, and Z directions illustrated in FIGS. 16A, 16B, 17, and 20C of the present embodiment are different from the definitions of the coordinates illustrated in FIGS. 1A, 1B, 2, 3, 4A, 4B, 5A, 5B, 5C, 6A, 6B, 6C, 6D, 7A, 7B, 8A, 8B, 8C, 8D, 9A, 9B, 10, 11A, 11B, 11C, 12A, 12B, 13A, 13B, 14, 15A, and 15B.

Figure 16B:
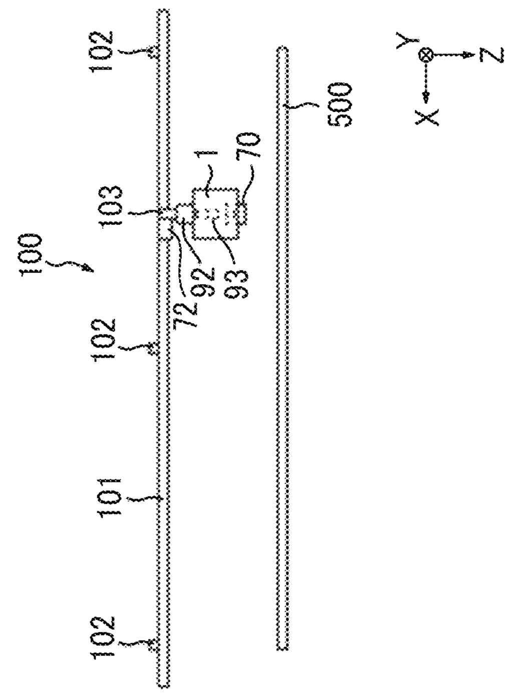
FIGS. 16A and 16B are diagrams each illustrating an overall schematic configuration of a liquid discharge apparatus, according to an embodiment of the present disclosure.
Figure 16A:
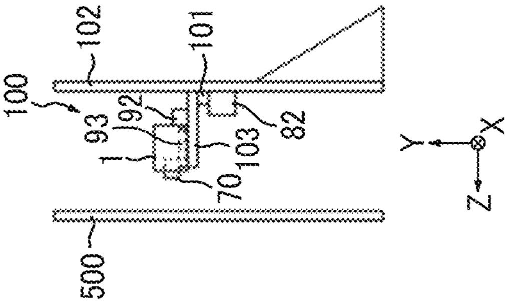

FIGS. 16A and 16B are diagrams each illustrating an overall schematic configuration of a liquid discharge apparatus 100, according to an embodiment of the present disclosure. FIG. 16A is a side view of the liquid discharge apparatus 100. FIG. 16B is a plan view of the liquid discharge apparatus 100.

The liquid discharge apparatus 100 is installed to face a liquid application object 500 as a discharge object. The liquid discharge apparatus 100 includes an X-axis rail 101, a Y-axis rail 102 intersecting the X-axis rail 101, and a Z-axis rail 103 intersecting the X-axis rail 101 and the Y-axis rail 102. In particular, in the present embodiment, the X-axis rail 101, the Y-axis rail 102, and the Z-axis rail 103 extend in directions orthogonal to each other.

The Y-axis rail 102 holds the X-axis rail 101 such that the X-axis rail 101 can move in the Y direction. The X-axis rail 101 holds the Z-axis rail 103 such that the Z-axis rail 103 can move in the X direction. The Z-axis rail 103 holds a carriage 1, which serves as a discharge head support, such that the carriage 1 can move in the Z direction.

The liquid discharge apparatus 100 includes a first Z-direction driver 92 and an X-direction driver 72. The first Z-direction driver 92 moves the carriage 1 in the Z direction along the Z-axis rail 103. The X-direction driver 72 moves the Z-axis rail 103 in the X direction along the X-axis rail 101.

The liquid discharge apparatus 100 also includes a Y-direction driver 82 to move the X-axis rail 101 in the Y direction along the Y-axis rail 102. The liquid discharge apparatus 100 further includes a second Z-direction driver 93 to move a head holder 70 in the Z direction with respect to the carriage 1.

The liquid discharge head 10 described above is attached to the head holder 70 such that the nozzles 14 (see FIG. 2) of the liquid discharge head 10 face the liquid application object 500.

The liquid discharge apparatus 100 as described above discharges ink, which is an example of liquid, from the liquid discharge head 10 attached to the head holder 70 toward the liquid application object 500 while moving the carriage 1 in the X direction, the Y direction, and the Z direction, to perform drawing on the liquid application object 500.

Figure 18:
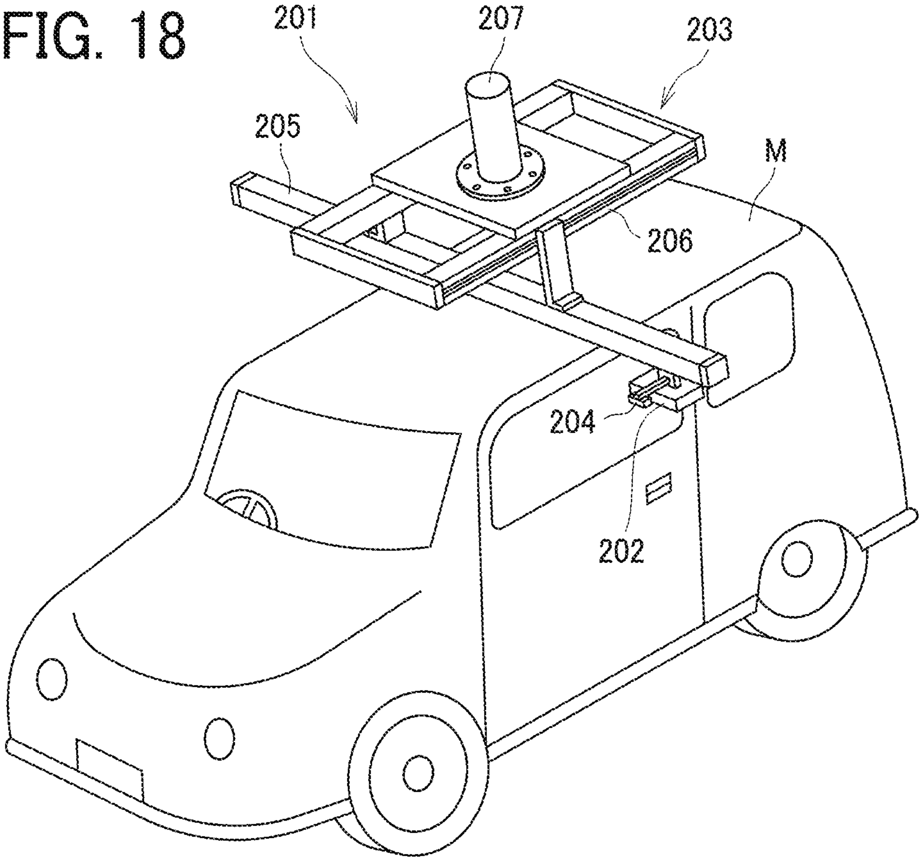
FIG. 18 is a perspective view of a liquid discharge apparatus mounted on an upper portion of an automobile, according to an embodiment of the present disclosure.
Figure 19:
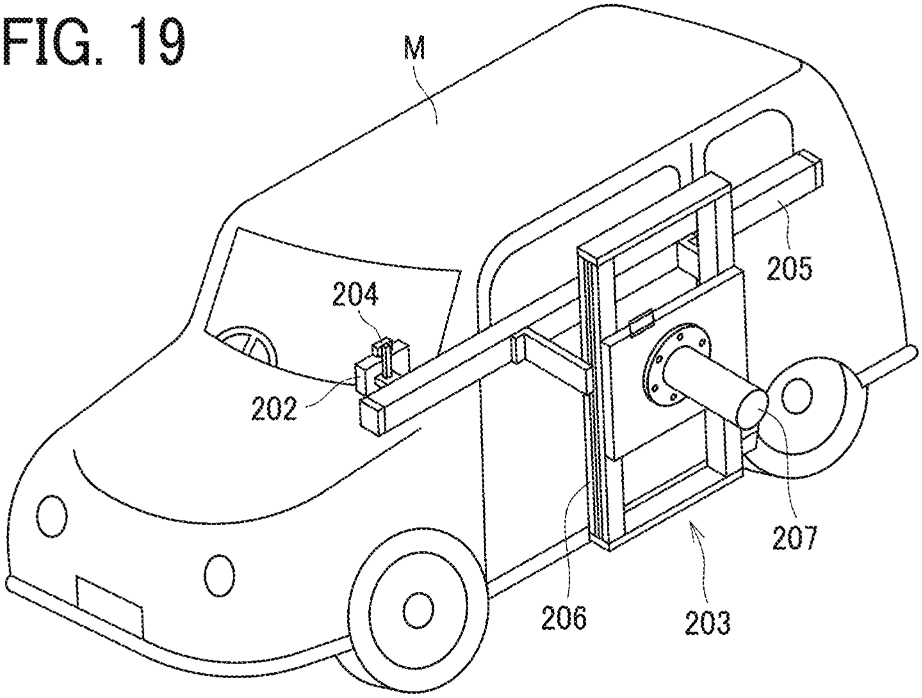
FIG. 19 is a perspective view of the liquid discharge apparatus of FIG. 18 mounted on a lateral side of an automobile.

Subsequently, an inkjet printer 201, which is another example of the liquid discharge apparatus, is described below with reference to FIGS. 17, 18, and 19.

Figure 17:
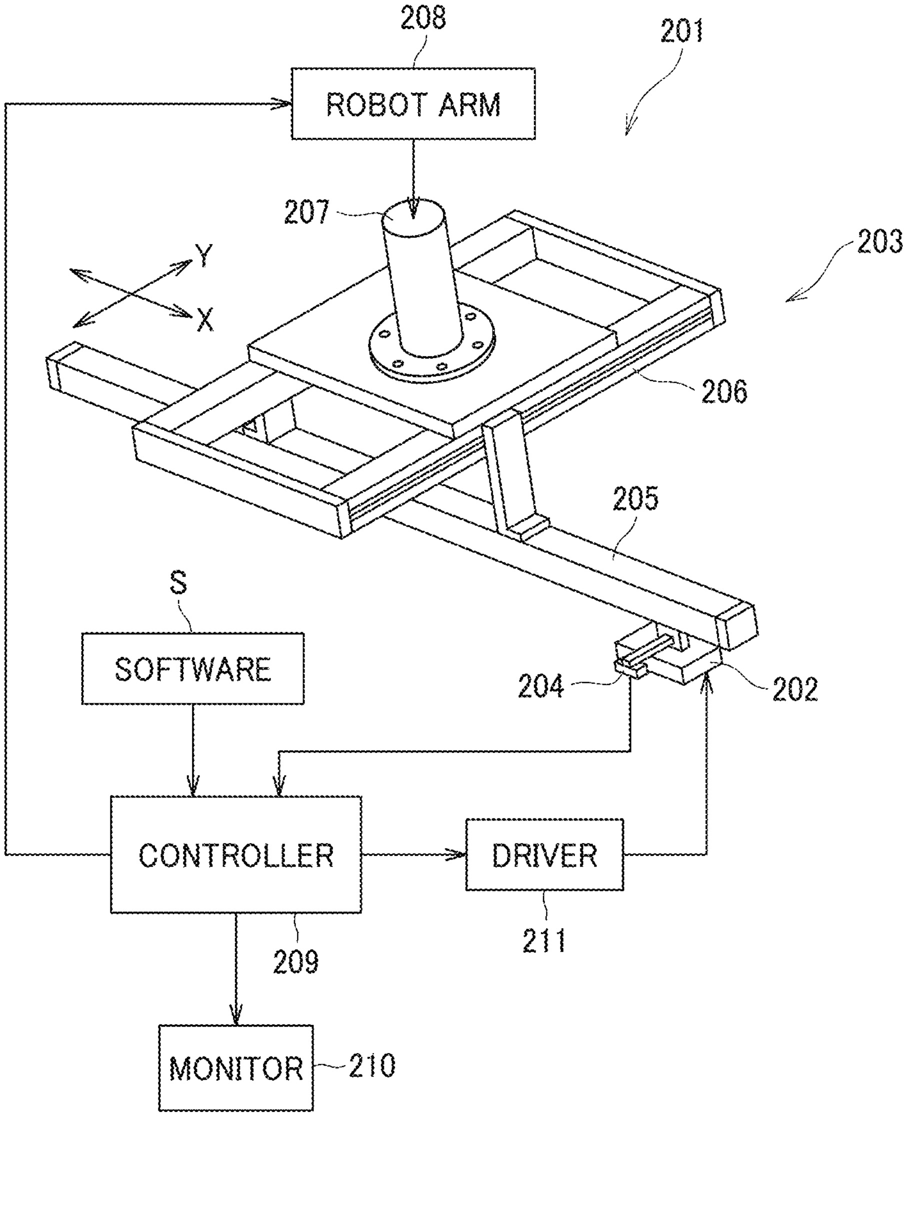
FIG. 17 is a schematic diagram illustrating a configuration of another liquid discharge apparatus of the present disclosure.

As illustrated in FIG. 17, the inkjet printer 201 according to an embodiment of the present disclosure includes, for example, a print head 202, an X-Y table 203, a camera 204, a controller 209, and a driver 211.

The print head 202 is an inkjet-type liquid discharge head that discharges ink, i.e., liquid, toward a surface to be printed of an object to be printed M. The term ink that is employed in the present embodiment includes paint. The print head 202 includes multiple valve-type nozzles, and ink is discharged from each of the valve-type nozzles in a direction perpendicular to the discharge surface of the print head 202.

In other words, the ink discharge surface of the print head 202 is parallel to an XY plane formed by the movement of the X-Y table 203. Ink dots discharged from each of the valve-type nozzles are discharged in a direction perpendicular to the X-Y plane. The ink is discharged from the valve-type nozzles in parallel to each other.

Each of the valve-type nozzles is connected to an ink tank of a predetermined color. The ink tank is pressurized by a pressing device. Accordingly, when the distances between the valve-type nozzles and a surface to be printed of the object to be printed M are approximately equal to 20 cm, ink dots can be discharged from the valve-type nozzles to the surface to be printed without any trouble.

The X-Y table 203 includes a mechanism for moving the print head 202 and the camera 204 in the X direction and the Y direction which are orthogonal to each other. Specifically, the X-Y table 203 includes an X-axis movement mechanism 205 and a Y-axis movement mechanism 206. The X-axis movement mechanism 205 moves a slider holding the print head 202 and the camera 204 to be described below in the X direction. The Y-axis movement mechanism 206 moves the X-axis movement mechanism 205 in the Y direction while holding the X-axis movement mechanism 205 with two arms.

The Y-axis movement mechanism 206 includes a shaft 207. The shaft 207 is held and driven by a robot arm 208. By so doing, the print head 202 can be freely arranged at a predetermined position at which printing is performed on the object to be printed M. For example, when the object to be printed M is an automobile, the robot arm 208 can arrange the print head 202 at an upper position of the automobile as illustrated in FIG. 18 or at a side position of the automobile as illustrated in FIG. 19.

Operation of the robot arm 208 is controlled based on a program stored in the controller 209 in advance.

The camera 204 is an imaging unit such as a digital camera that captures an image of the surface to be printed of the object to be printed M. The camera 204 captures an image of a predetermined range of the surface to be printed of the object to be printed M at a constant minute interval while moving in the X direction and the Y direction by the X-axis movement mechanism 205 and the Y-axis movement mechanism 206, respectively.

The specifications of, for example, the lens and resolution of the camera 204 are selected as appropriate such that multiple subdivided images can be captured for the predetermined range of the surface to be printed. The capturing of the multiple subdivided images of the surface to be printed by the camera 204 is continuously and automatically performed by the controller 209 to be described below.

The controller 209 causes the X-Y table 203 to operate based on image editing software S for editing images captured by the camera 204 and a preset control program to control the printing operation, i.e., ink discharge operation, of the print head 202. The controller 209 includes a so-called microcomputer. The controller 209 includes, for example, a storage device, a central processing unit (CPU), input devices such as a keyboard and a mouse, and a digital versatile disc (DVD) player as needed. The storage device records and stores various programs, captured images, and images to be printed. The CPU executes various processing in accordance with the programs.

The controller 209 further includes a monitor 210. The monitor 210 displays, for example, input data to the controller 209, processing results by the controller 209.

The controller 209 performs image processing on the multiple pieces of subdivided image data captured by the camera 204 using image processing software. By so doing, the controller 209 generates a composite print surface obtained by projecting the surface to be printed, which is not a flat surface, of the object to be printed M onto a flat surface.

In addition, the controller 209 superimposes an image to be drawn with an image already printed on the surface to be printed continuously on the composite print surface. Then, the controller 209 performs editing such that the image to be drawn continues with an edge of the image which has already been printed, to generate an edited image to be drawn. For example, the controller 209 edits a print image **252*b*, which is an image to be drawn illustrated in FIG. 20C, such that the print image 252*b* matches a print image 252*a* with a composite print surface and a non-print region 253 is not formed between the print image 252*b* and the adjacent print image 252*a*. By so doing, the controller 209 generates an edited image to be drawn. Subsequently, ink is discharged from the print head 202** onto a surface to be printed based on the generated edited image to be drawn. By so doing, a new image is printed without a gap between the new image and the image that has been printed.

The operation of capturing the multiple subdivided images by the camera 204 and the operation of printing by discharging ink from each nozzle of the print head 202 are performed by the driver 211 whose operation is controlled by the controller 209.

Figure 20A:
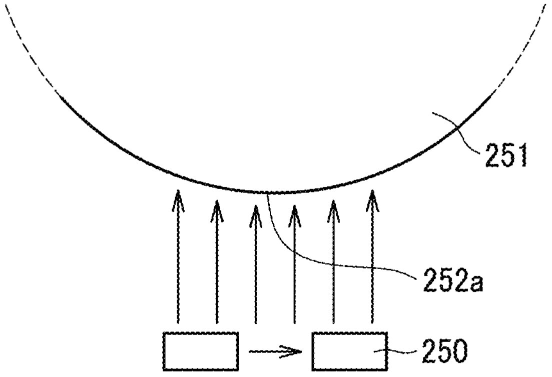
FIGS. 20A, 20B, and 20C are diagrams each illustrating a case in which a liquid discharge apparatus discharges liquid onto a spherical surface, according to an embodiment of the present disclosure.

In FIG. 20A, arrows are illustrated to indicate a direction in which ink is discharged from each of the inkjet nozzles mounted on the nozzle head 250, when a two-dimensional rectangle is formed by the ink discharged from the inkjet nozzles on a spherical surface of a liquid application object 251 which is a spherical object.

Figure 20B:
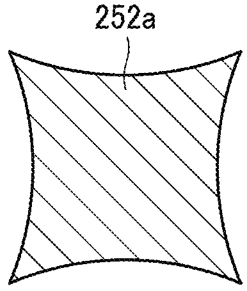
Figure 20C:
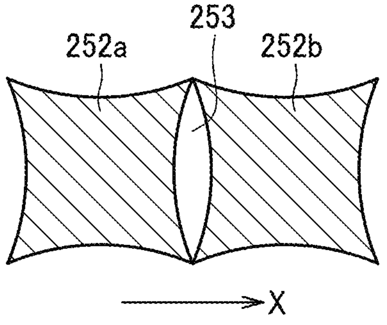

In FIG. 20B, ink discharged from the inkjet nozzles mounted on the nozzle head 250 is discharged in a direction perpendicular to the nozzle head 250. Accordingly, the print image **252*a* that is printed on the liquid application object 251** is illustrated as a rectangle with distorted edges.

Electrode Manufacturing Apparatus

Figure 21:
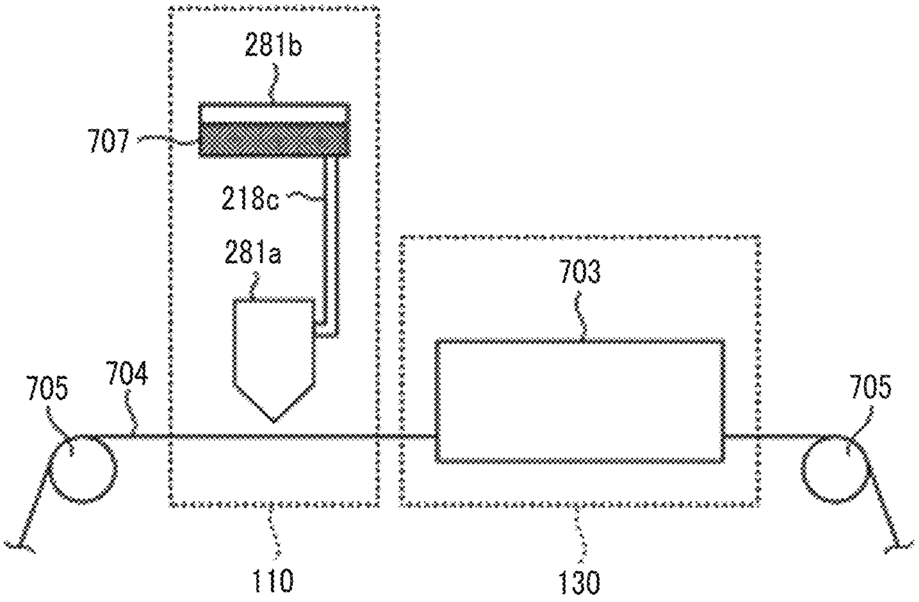
FIG. 21 is a schematic diagram illustrating an electrode manufacturing apparatus to manufacture electrodes in an electrode manufacturing method according to an embodiment of the present disclosure.

Embodiments of the present disclosure can also be applied to electrode manufacturing apparatuses and electrochemical element manufacturing apparatuses. An electrode manufacturing apparatus according to an embodiment of the present disclosure is described below. FIG. 21 is a diagram illustrating an electrode manufacturing apparatus according to the present embodiment. The electrode manufacturing apparatus discharges liquid composition using the above-described liquid discharge apparatus 100 to manufacture electrodes each having a layer containing an electrode material.

Device for Forming Layer Containing Electrode Material and Process of Forming Layer Containing Electrode Material The above-described liquid discharge apparatus 100 serves as a discharger of the present embodiment to discharge the above-described liquid. The liquid discharge apparatus 100 discharges liquid composition to apply the liquid composition onto an object to form a liquid composition layer. The above-described object, which may also be referred to simply as a discharge object in the following description, is not particularly limited and may be appropriately selected depending on the intended purpose, as long as a layer containing the electrode material can be formed on the object. Examples of the object include an electrode circuit board, i.e., a current collector, an active material layer, and a layer containing a solid electrode material.

The discharger and the discharging process may have a configuration in which the liquid composition is directly discharged to form a layer containing the electrode material or a configuration in which the liquid composition is indirectly discharged to form a layer containing the electrode material, as long as the layer containing the electrode material can be formed on the discharge object.

Other Configurations and Other Processes

Other configurations of the apparatus for manufacturing the electrode mixture layer are not particularly limited and may be appropriately selected depending on the intended purpose, as long as the effects of embodiments of the present disclosure are not impaired. Examples of the other configurations include a heater. Other processes that are included in the method for producing the electrode mixture layer are not particularly limited and may be appropriately selected depending on the intended purpose, as long as the effects of embodiments of the present disclosure are not impaired. Examples of the other processes include a heating process.

Heater and Heating Process

The above-described heaters 12 serves as a heater to heat the liquid composition discharged by the discharger, i.e., the liquid discharge apparatus 100. The heating process is a process of heating the liquid composition discharged in the above-described discharging process. The liquid composition layer can be dried in the heating process.

Electrode Manufacturing Apparatus that Directly Discharges Liquid Composition to Form Layer Containing Electrode Material An electrode manufacturing apparatus that forms an electrode mixture layer containing an active material on an electrode substrate, i.e., a current collector, is described below. The electrode manufacturing apparatus includes a discharge process unit 110 and a heating process unit 130. The discharge process unit 110 performs a process of applying a liquid composition onto a printing base material 704 including a discharge object to form a liquid composition layer. The heating process unit 130 performs a heating process of heating the liquid composition layer to obtain an electrode mixture layer.

The electrode manufacturing apparatus includes a conveyor 705 to convey the printing base material 704. The conveyor 705 conveys the printing base material 704 via the discharge process unit 110 and the heating process unit 130 sequentially in this order at a preset speed. A method that produces the printing base material 704 having the discharge object such as the active material layer is not particularly limited, and a known method can be selected as appropriate.

The discharge process unit 110 includes a printer 281*a* that performs an application process of applying the liquid composition 707 onto the printing base material 704, a storage container 281*b* that stores the liquid composition, and a supply tube 281*c* that supplies the liquid composition stored in the storage container 281*b* to the printer 281*a*.

The storage container 281*b* stores the liquid composition 707. The discharge process unit 110 discharges the liquid composition 707 from the printer 281*a* and applies the liquid composition 707 onto the printing base material 704, to form a liquid composition layer in a thin film shape. The storage container 281*b* may be integrated with an apparatus for manufacturing the electrode-mixture layer or may be detachable from the apparatus for manufacturing the electrode-mixture layer.

The storage container 281*b* may be a container additionally attachable to a container integrated with the apparatus for manufacturing the electrode-mixture layer or a container additionally detachable from the apparatus for manufacturing the electrode mixture layer.

The storage container 281*b* and the supply tube 281*c* can be selected as desired as long as the liquid composition 707 can be stably stored and supplied.

As illustrated in FIG. 21, the heating process unit 130 includes a heating device 703. The heating process unit 130 performs a solvent removal process in which residual solvent in the liquid composition layer is heated, dried, and removed by the heating device 703. Thus, the electrode mixture layer can be formed. The heating process unit 130 may perform the solvent removal process under reduced pressure.

The heating device 703 is not particularly limited and may be appropriately selected depending on the intended purpose. Examples of the heating device 703 include, for example, a circuit board heater, an infrared (IR) heater, and a hot air heater. A circuit board heater, an IR heater, and a hot air heater may be combined to serve as the heating device 703. Heating temperature and heating time can be appropriately selected in accordance with the boiling point of the solvent contained in the liquid composition 707 and the thickness of the liquid composition layer to be formed.

Figure 22:
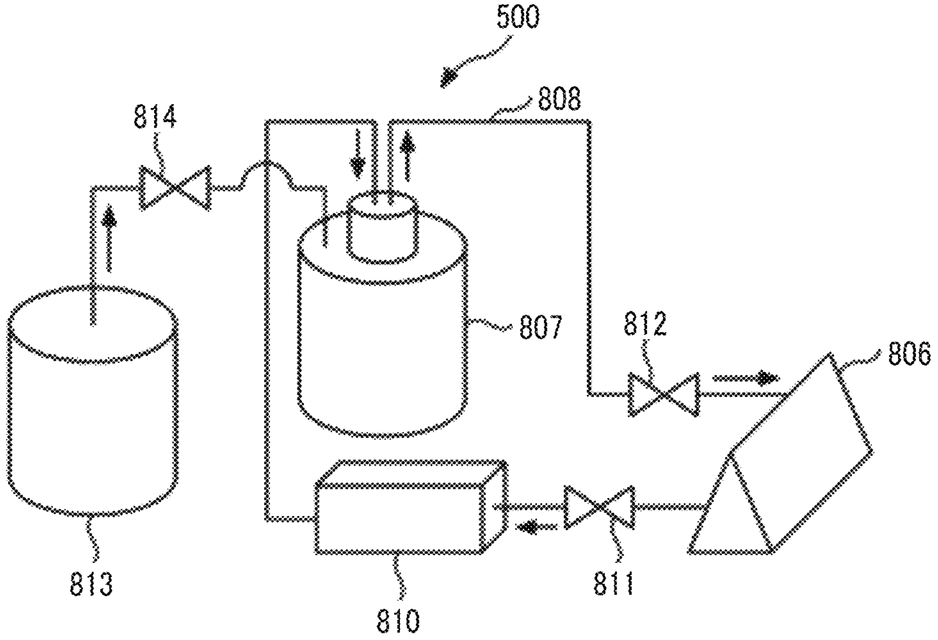
FIG. 22 is a schematic diagram illustrating an electrode manufacturing apparatus to manufacture electrodes in a manufacturing method of an electrode mixture layer, according to an embodiment of the present disclosure.

FIG. 22 is a diagram illustrating an electrode manufacturing apparatus, i.e., the liquid discharge apparatus 100, according to an embodiment different from the above-described embodiments of the present disclosure. The liquid discharge apparatus 100 controls a pump 810, and control valves 811 and 812. By so doing, the liquid composition can be circulated through a discharge head 806, a tank 807, and a tube 808.

The liquid discharge apparatus 100 includes an external tank 813. When the liquid composition in the tank 807 is reduced, the pump 810 and the control valves 811, 812, and a control valve 814 are controlled such that the liquid composition can be supplied from the external tank 813 to the tank 807. When the electrode manufacturing apparatus according to the present embodiment is employed, the liquid composition can be discharged to intended positions of the discharge object.

The above-described electrode mixture layer may be suitably employed as, for example, a portion of an electrochemical element. The configuration of the electrochemical device other than the electrode mixture layer is not particularly limited, and a known configuration can be appropriately selected. Examples of the electrochemical device include a positive electrode, a negative electrode, and a separator.

The above-descried configurations are examples, and the following aspects of the present disclosure have, for example, advantageous effects described below.

First Aspect

A liquid discharge head such as the liquid discharge head 10 includes a first housing such as the first housing 301, 301*d*, and 301L, a sealing member such as the sealing member 41, 41A, 41F, and 41L, a second housing such as the second housing 302, 302*d*, and 302L. The first housing includes a nozzle such as the nozzle 14 and 14L, from which a liquid is dischargeable and a liquid chamber such as the channel 17 communicating with the nozzle. The sealing member openably closes the nozzle. The second housing includes a moving member such as the needle 310, 310T, 310M, and 310L, and a container such as the needle container 3024. The moving member moves a portion of the sealing member between a first position at which the portion of the sealing member contacts the nozzle to close the nozzle and a second position at which the portion of the sealing member is separated from the nozzle to open the nozzle. The container stores and holds the moving member in the container.

The sealing member is sandwiched between the first housing and the second housing to partition the liquid chamber and the container.

Second Aspect

In the liquid discharge head according to the first aspect, the liquid is ink containing particles containing inorganic substances as components.

Third Aspect

In the liquid discharge head according to the first or the second aspect, the sealing member includes a valve such as the valve 40, 40A, 40L, 40T, or 40U, deformable in accordance with the movement of the moving member, and a reinforcing member such as the reinforcement plate 42, 42L, 42T, or 42U, bonded to the valve and sandwiched between the first housing and the second housing to support the valve.

Fourth Aspect

In the liquid discharge head according to the third aspect, the reinforcing member contacts a portion of the second housing opposite a surface of the reinforcing member bonded to the valve in the moving direction of the moving member.

Fifth Aspect

In the liquid discharge head according to the third or the fourth aspect, the deformation of the valve by the moving member at the first position is larger than the deformation of the valve by the moving member at the second position.

Sixth Aspect

In the liquid discharge head according to any one of the third to fifth aspects, the valve contacts a portion of the first housing and is sandwiched between the first housing and the second housing.

Seventh Aspect

In the liquid discharge head according to any one of the third to sixth aspects, the reinforcing member and the valve are joined to each other by an adhesive such as the adhesive layer 43 or 43L.

Eighth Aspect

In the liquid discharge head according to any one of the first to seventh aspects, at least one of the first housing or the second housing includes a step on an outer perimeter of at least one of the first housing or the second housing, and the sealing member is sandwiched between the first housing and the second housing and contacts the step.

Ninth Aspect

In the liquid discharge head according to the third or the fourth aspect, the first housing includes a first step on the outer perimeter of the first housing. The second housing includes a second step on the outer perimeter of the second housing. The second step is fitted to the first step in a fitting direction. The first step of the first housing has a first length E1 in the fitting direction. The second step of the second housing has a second length E2 in the fitting direction. A difference E between the first length E1 and the second length E2 is smaller than a thickness B of the sealing member before the sealing member is sandwiched between the first housing and the second housing. The difference E is larger than the thickness of the reinforcing member C in the fitting direction.

Tenth Aspect

In the liquid discharge head according to the ninth aspect, a formula of $C<E<B-[(B-C)\times(5\text{ to }50\%)]$ is satisfied, where B is a thickness of the sealing member, and C is a thickness of the reinforcing member.

Eleventh Aspect

In the liquid discharge head according to the third or the fourth aspect, the sealing member includes the valve and the reinforcing member bonded to the valve. The valve and the reinforcing member are sandwiched between the first housing and the second housing. The valve is compressed and deformed by the pressure applied to the sealing member by the first housing and the second housing.

Twelfth Aspect

The liquid discharge head according to any one of the first to eleventh aspects, further includes a fastening member to fasten the first housing and the second housing sandwiching the sealing member.

Thirteenth Aspect

In the liquid discharge head according to the third aspect, the reinforcing member includes a fitting portion. The valve includes an elastic cap fitted into the fitting portion of the reinforcing member.

Fourteenth Aspect

In the liquid discharge head according to the third aspect, the moving member includes a needle such as the needle 310M having a rounded tip. The needle presses and deforms the elastic sheet in accordance with the movement of the needle.

Fifteenth Aspect

The liquid discharge head according to the fourteenth aspect, further includes a lubricant such as an intermediate layer 310*s*, interposed between the tip of the needle and the elastic sheet.

Sixteenth Aspect

The liquid discharge head according to the fourteenth aspect, further includes an adhesive such as an intermediate layer 310*s* interposed at least between the tip of the needle and the elastic sheet.

Seventeenth Aspect

The liquid discharge head according to any one of the first to sixteenth aspects, includes multiple moving members including the moving member and multiple nozzles including the nozzle.

Eighteenth Aspect

A liquid discharge apparatus such as the liquid discharge apparatus 100 that discharges liquid, includes the liquid discharge head according to any one of the first to seventeenth aspects, a discharge head support such as the carriage 1 to support the liquid discharge head, and a liquid supply device to supply the liquid to the liquid discharge head.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

The invention claimed is:

1. A liquid discharge head comprising:
   a first housing including:
      a nozzle from which a liquid is dischargeable; and
      a liquid chamber communicating with the nozzle;
   a seal to openably close the nozzle;
   a second housing including:
      a mover to move a portion of the seal in a moving direction between:

a first position at which the portion of the seal contacts the nozzle to close the nozzle; and
a second position at which the portion of the seal is separated from the nozzle to open the nozzle; and
a container to store and hold the mover in the container,
wherein the seal is sandwiched between the first housing and the second housing to partition the liquid chamber and the container,
wherein the seal includes:
a valve deformable in accordance with a movement of the mover; and
a reinforcement bonded to the valve and sandwiched between the first housing and the second housing, to support the valve,
wherein at least one of the first housing or the second housing includes a step on an outer perimeter of said at least one of the first housing or the second housing,
wherein the seal is sandwiched between the first housing and the second housing and contacts the step, and
wherein the seal is sandwiched by an inner step of the step.

2. The liquid discharge head according to claim 1, wherein:
the liquid is ink containing particles containing an inorganic substance as a component.

3. The liquid discharge head according to claim 1, wherein;
the valve is an elastic sheet deformable by the mover to press and deform the elastic sheet.

4. The liquid discharge head according to claim 3, wherein;
the mover includes a needle having a rounded tip, and
the needle presses and deforms the elastic sheet in accordance with the movement of the needle.

5. The liquid discharge head according to claim 4, further comprising:
a lubricant interposed between the tip of the needle and the elastic sheet.

6. The liquid discharge head according to claim 4, further comprising:
an adhesive interposed between the tip of the needle and the elastic sheet.

7. The liquid discharge head according to claim 1, wherein:
the reinforcement contacts a portion of the second housing opposite a surface of the reinforcement bonded to the valve in the moving direction of the mover.

8. The liquid discharge head according to claim 1, wherein:
a deformation of the valve by the mover at the first position is larger than a deformation of the valve by the mover at the second position.

9. The liquid discharge head according to claim 1, wherein;
the valve contacts a portion of the first housing and is sandwiched between the first housing and the second housing.

10. The liquid discharge head according to claim 1, wherein;
the reinforcement and the valve are joined to each other by an adhesive.

11. The liquid discharge head according to claim 1, wherein;
the first housing includes a first step on an outer perimeter of the first housing,
the second housing includes a second step on an outer perimeter of the second housing, the second step fitted to the first step in a fitting direction,
the first step of the first housing has a first length E1 in the fitting direction,
the second step of the second housing has a second length E2 in the fitting direction,
a difference E between the first length E1 and the second length E2 is smaller than a thickness B of the seal before the seal is sandwiched between the first housing and the second housing, and
the difference E is larger than a thickness C of the reinforcement in the fitting direction.

12. The liquid discharge head according to claim 11, wherein;
a formula of $C<E<B-[(B-C)\times(5 \text{ to } 50\%)]$ is satisfied,
where B is a thickness of the seal, and
C is a thickness of the reinforcement.

13. The liquid discharge head according to claim 1, wherein;
the seal includes:
the valve; and
the reinforcement bonded to the valve,
the valve and the reinforcement are sandwiched between the first housing and the second housing, and
the valve is compressed and deformed by a pressure applied to the seal by the first housing and the second housing.

14. The liquid discharge head according to claim 1, further comprising:
a fastener to fasten the first housing and the second housing sandwiching the seal.

15. The liquid discharge head according to claim 1, wherein;
the reinforcement includes a fitting portion, and
the valve includes an elastic cap fitted into the fitting portion of the reinforcement.

16. The liquid discharge head according to claim 1, further comprising:
multiple movers including the mover; and
multiple nozzles including the nozzle.

17. A liquid discharge apparatus comprising:
the liquid discharge head according to claim 1;
a discharge head support to support the liquid discharge head; and
a liquid supply to supply the liquid to the liquid discharge head.

18. A liquid discharge head comprising:
a first housing including:
a nozzle from which a liquid is dischargeable; and
a liquid chamber communicating with the nozzle;
a seal to openably close the nozzle;
a second housing including:
a mover to move a portion of the seal in a moving direction between:
a first position at which the portion of the seal contacts the nozzle to close the nozzle; and
a second position at which the portion of the seal is separated from the nozzle to open the nozzle; and
a container to store and hold the mover in the container,
wherein the seal is sandwiched between the first housing and the second housing to partition the liquid chamber and the container,
wherein the seal includes:
a valve deformable in accordance with a movement of the movers; and a reinforcement bonded to the valve and sandwiched between the first housing and the second housing, to support the valve, wherein:

the first housing includes a first step on an outer perimeter of the first housing, the second housing includes a second step on an outer perimeter of the second housing, the second step fitted to the first step in a fitting direction, the first step of the first housing has a first length E1 in the fitting direction, the second step of the second housing has a second length E2 in the fitting direction, a difference E between the first length E1 and the second length E2 is smaller than a thickness B of the seal before the seal is sandwiched between the first housing and the second housing, and the difference E is larger than a thickness C of the reinforcement in the fitting direction.

19. A liquid discharge head comprising:

a first housing including:

a nozzle from which a liquid is dischargeable; and a liquid chamber communicating with the nozzle;

a seal to openably close the nozzle;

a second housing including:

a mover to move a portion of the seal in a moving direction between:

a first position at which the portion of the seal contacts the nozzle to close the nozzle; and a second position at which the portion of the seal is separated from the nozzle to open the nozzle; and a container to store and hold the mover in the container, wherein the seal is sandwiched between the first housing and the second housing to partition the liquid chamber and the container, wherein the seal includes:

a valve deformable in accordance with a movement of the movers; and a reinforcement bonded to the valve and sandwiched between the first housing and the second housing, to support the valve, wherein:

the reinforcement includes a fitting portion, and the valve includes an elastic cap fitted into the fitting portion of the reinforcement.

* * * * *